(12) United States Patent
Kondo et al.

(10) Patent No.: US 10,345,728 B2
(45) Date of Patent: Jul. 9, 2019

(54) TONER FOR ELECTROPHOTOGRAPHY

(71) Applicant: Kao Corporation, Tokyo (JP)

(72) Inventors: Hideaki Kondo, Sakai (JP); Kohei Katayama, Wakayama (JP); Kouta Ijichi, Wakayama (JP); Hiroki Kakiuchi, Izumiotsu (JP)

(73) Assignee: Kao Corporation, Tokyo (JP)

( * ) Notice: Subject to any disclaimer, the term of this patent is extended or adjusted under 35 U.S.C. 154(b) by 106 days.

(21) Appl. No.: 15/528,585

(22) PCT Filed: Dec. 4, 2015

(86) PCT No.: PCT/JP2015/084171
§ 371 (c)(1),
(2) Date: May 22, 2017

(87) PCT Pub. No.: WO2016/098616
PCT Pub. Date: Jun. 23, 2016

(65) Prior Publication Data
US 2018/0348656 A1    Dec. 6, 2018

(30) Foreign Application Priority Data

Dec. 16, 2014    (JP) .................................. 2014-254148

(51) Int. Cl.
*G03G 9/08* (2006.01)
*G03G 9/087* (2006.01)
*C08G 63/12* (2006.01)
*C08G 63/16* (2006.01)

(52) U.S. Cl.
CPC ......... *G03G 9/08782* (2013.01); *C08G 63/12* (2013.01); *C08G 63/16* (2013.01); *G03G 9/08708* (2013.01); *G03G 9/08726* (2013.01); *G03G 9/08755* (2013.01); *G03G 9/08791* (2013.01); *G03G 9/08795* (2013.01); *G03G 9/08797* (2013.01)

(58) Field of Classification Search
CPC ........... G03G 9/08782; G03G 9/08755; G03G 9/08791
USPC .............................. 430/109.4, 109.3, 108.8
See application file for complete search history.

(56) References Cited

U.S. PATENT DOCUMENTS

| | | |
|---|---|---|
| 2011/0294061 A1 | 12/2011 | Shirai et al. |
| 2013/0183617 A1 | 7/2013 | Eida et al. |
| 2014/0363763 A1 | 12/2014 | Shibata et al. |

FOREIGN PATENT DOCUMENTS

| | | |
|---|---|---|
| JP | 2010-139659 A | 6/2010 |
| JP | 2011-53494 A | 3/2011 |
| JP | 2011-59418 A | 3/2011 |
| JP | 2011-107341 A | 6/2011 |
| JP | 2011-253013 A | 12/2011 |
| JP | 2012-58337 A | 3/2012 |
| JP | 2012-63417 A | 3/2012 |
| JP | 2012-226296 A | 11/2012 |
| JP | 2013-15771 A | 1/2013 |
| JP | 2013-109237 A | 6/2013 |
| JP | 2013-140339 A | 7/2013 |
| JP | 2014-59430 A | 4/2014 |
| JP | 2014-186188 A | 10/2014 |
| JP | 2014-232169 A | 12/2014 |
| JP | 2014-235361 A | 12/2014 |
| JP | 2014-235409 A | 12/2014 |
| JP | 2016-114825 A | 6/2016 |
| JP | 2016-114826 A | 6/2016 |
| JP | 2016-114829 A | 6/2016 |

OTHER PUBLICATIONS

Office Action dated Aug. 9, 2018 in Japanese Patent Application No. 2014-254148.
Extended European Search Report dated May 4, 2018 in Patent Application No. 15869821.7.
Observation by a Third Party issued Apr. 25, 2018 in Japanese Patent Application No. 2014-254148.
Office Action dated May 30, 2018 in Japanese Patent Application No. 2014-254148.
International Search Report dated Feb. 16, 2016 in PCT/JP2015/084171.

*Primary Examiner* — Mark A Chapman
(74) *Attorney, Agent, or Firm* — Oblon, McClelland, Maier & Neustadt, L.L.P.

(57) ABSTRACT

A toner for electrophotography containing a resin binder containing a crystalline composite resin C and an amorphous polyester A and an ester wax, wherein the crystalline composite resin C is a resin containing a polycondensation resin component and a styrenic resin component, wherein the polycondensation resin component is obtained by polycondensing an alcohol component containing an aliphatic diol having 9 or more carbon atoms and 14 or less carbon atoms, and a carboxylic acid component containing an aliphatic dicarboxylic acid compound having 9 or more carbon atoms and 14 or less carbon atoms, wherein a mass ratio of the amorphous polyester A to the crystalline composite resin C (amorphous polyester A/crystalline composite resin C) is 60/40 or more and 95/5 or less, and wherein a mass ratio of the crystalline composite resin C to the ester wax (crystalline composite resin C/ester wax) is 0.5 or more and 9 or less. The toner for electrophotography of the present invention is suitably used in development of latent images or the like which is formed in electrostatic development method, electrostatic recording method, electrostatic printing method or the like.

20 Claims, No Drawings

TONER FOR ELECTROPHOTOGRAPHY

CROSS REFERENCE TO RELATED APPLICATION

This application is a National Stage entry under 35 USC 371 of PCT/JP2015/084171, filed on Dec. 4, 2015, and claims priority to Japanese Patent Application No. 2014-254148, filed on Dec. 16, 2014.

FIELD OF THE INVENTION

The present invention relates to a toner for electrophotography usable in developing latent images formed in, for example, electrophotography, electrostatic recording method, electrostatic printing method or the like, and a method for producing the same.

BACKGROUND OF THE INVENTION

From the viewpoint of speed-up of printing apparatuses and conservation of energy, a toner having excellent low-temperature fusing ability is in demand. However, if a softening point or a glass transition temperature of a toner is designed to be low in order to improve low-temperature fusing ability, there is a disadvantage of lowering storage stability. In view of the above, in order to satisfy low-temperature fusing ability and storage stability, the development of a toner using a crystalline polyester has been made.

For example, Patent Publication 1 discloses a crystalline resin for a toner comprising a composite resin containing a polycondensation resin component and a styrenic resin component, wherein the polycondensation resin component is obtained by polycondensing an alcohol component containing an aliphatic diol having from 2 to 10 carbon atoms and a carboxylic acid component containing an aromatic dicarboxylic acid.

Patent Publication 2 discloses a toner for electrostatic image development comprising a resin binder comprising: a crystalline hybrid resin (1-2) containing a crystalline polyester component and an addition polymerization resin component, obtained by polymerizing
  raw material monomers for a crystalline polyester containing a diol having from 8 to 12 carbon atoms and a dicarboxylic acid compound having from 10 to 12 carbon atoms, a total content of both the diol and the dicarboxylic acid compound is 80% by mol or more,
  raw material monomers for an addition polymerization resin, and
  a compound capable of reacting with both the raw material monomers for a crystalline polyester and the raw material monomers for an addition polymerization resin in an amount of from 3 to 15 parts by weight, based on 100 parts by weight of the raw material monomers for the addition polymerization resin; and
an amorphous hybrid resin (2-2) containing an amorphous polycondensation resin component and an addition polymerization resin component, obtained by polymerizing
  raw material monomers for an amorphous polycondensation resin containing an alcohol component and a carboxylic acid component containing an aromatic dicarboxylic acid compound,
  raw material monomers for an addition polymerization resin,
  a compound capable of reacting with both the raw material monomers for an amorphous polycondensation resin and the raw material monomers for an addition polymerization resin in an amount of from 2 to 15 parts by weight, based on 100 parts by weight of the raw material monomers for an addition polymerization resin,
wherein a weight ratio of the crystalline hybrid resin (1-2) to the amorphous hybrid resin (2-2) (crystalline hybrid resin (1-2)/amorphous hybrid (2-2)) is from 1/99 to 40/60.

Patent Publication 1: Japanese Patent Laid-Open No. 2010-139659
Patent Publication 2: Japanese Patent Laid-Open No. 2013-109237

SUMMARY OF THE INVENTION

The present invention relates to:
[1] A toner for electrophotography containing
a resin binder containing a crystalline composite resin C and an amorphous polyester A and
an ester wax,
wherein the crystalline composite resin C is a resin containing a polycondensation resin component and a styrenic resin component,
wherein the polycondensation resin component is obtained by polycondensing an alcohol component containing an aliphatic diol having 9 or more carbon atoms and 14 or less carbon atoms, and a carboxylic acid component containing an aliphatic dicarboxylic acid compound having 9 or more carbon atoms and 14 or less carbon atoms,
wherein a mass ratio of the amorphous polyester A to the crystalline composite resin C (amorphous polyester A/crystalline composite resin C) is 60/40 or more and 95/5 or less, and
wherein a mass ratio of the crystalline composite resin C to the ester wax (crystalline composite resin C/ester wax) is 0.5 or more and 9 or less; and
[2] a method for producing a toner for electrophotography as defined in the above [1], including:
step 1: melt-kneading toner components containing a crystalline composite resin C, an amorphous polyester A, and an ester wax with an open roller-type kneader; and
step 2: pulverizing a kneaded product obtained.

DETAILED DESCRIPTION OF THE INVENTION

In the crystalline resin described in Patent Publication 1, since an aromatic dicarboxylic acid compound is used as the carboxylic acid component constituting the polycondensation resin component, and a medium-chained aliphatic diol is used as the alcohol component, the compatibility with the amorphous resin becomes higher, so that further improvements in heat-resistant storage property and durability are in demand.

In addition, in the crystalline resin described in Patent Publication 2, since sebacic acid is used as the carboxylic acid component constituting the polycondensation resin component, and even though a long-chained aliphatic diol is used as the alcohol component, a hybrid resin is used as an amorphous resin, the compatibility with the amorphous resin becomes higher, so that further improvements in heat-resistant storage property and durability are in demand in the same manner.

The present invention relates to a toner for electrophotography having excellent low-temperature fusing ability, heat-resistant storage property, and durability, and a method for producing the toner.

The toner for electrophotography of the present invention exhibits some excellent effects in low-temperature fusing ability, heat-resistant storage property, and durability.

The toner for electrophotography (hereinafter also simply referred to as toner) of the present invention contains
a resin binder containing
a crystalline composite resin C containing a polycondensation resin component using a long-chained aliphatic monomer, and
an amorphous polyester A; and
an ester wax.

Although the reasons why the toner for electrophotography of the present invention has excellent low-temperature fusing ability, heat-resistant storage property (hereinafter also simply referred to as storage property), and durability are not certain, it is considered to be as follows.

Since the crystalline composite resin C contained in the toner of the present invention contains a polycondensation resin component using a long-chained aliphatic monomer, its hydrophobicity is high. Therefore, it is considered that since the crystalline composite resin C has a low compatibility with the amorphous polyester A, the crystalline composite resin is more likely to be crystallized, and has excellent low-temperature fusing ability and storage property. However, because of its high crystallinity, the dispersibility in the amorphous polyester A is worsened, so that low-temperature fusing ability and storage property as originally anticipated cannot be exhibited, and moreover, the crystalline composite resin C and the amorphous polyester A are likely to crack at the interface thereof in the toner, thereby also lowering durability.

In view of the above, it has been found that by using an ester wax together therewith in a specified amount, the toner has excellent durability while satisfying low-temperature fusing ability and heat-resistant storage property. This is considered to be due to the fact that a hydrophilic-hydrophobic balance of the ester wax may be in an intermediate between the crystalline composite resin C and the amorphous polyester A, so that the dispersibility of the crystalline composite resin C in the toner is enhanced.

In the present invention, the crystallinity of the resin is expressed by a crystallinity index defined by a value of a ratio of a softening point to a highest temperature of endothermic peak determined by a scanning differential calorimeter, i.e. [softening point/highest temperature of endothermic peak]. The crystalline resin is a resin having a crystallinity index of from 0.6 to 1.4, preferably from 0.7 to 1.2, and more preferably from 0.9 to 1.2, and the amorphous resin is a resin having a crystallinity index exceeding 1.4 or less than 0.6, preferably exceeding 1.5 or 0.5 or less, and more preferably 1.6 or more and 0.5 or less. The crystallinity of the resin can be adjusted by the kinds of the raw material monomers and ratios thereof, production conditions, e.g., reaction temperature, reaction time, cooling rate, and the like. Here, the highest temperature of endothermic peak refers to a temperature of the peak on the highest temperature side among endothermic peaks observed. In the crystalline resin, the highest temperature of endothermic peak is defined as a melting point. Here, in the present invention, when simply referred to as the "resin," it means both the crystalline resin and the amorphous resin.

The crystalline composite resin C is a resin containing a polycondensation resin component and a styrenic resin component, wherein the polycondensation resin component is obtained by polycondensing an alcohol component containing an aliphatic diol having 9 or more carbon atoms and 14 or less carbon atoms and a carboxylic acid component containing an aliphatic dicarboxylic acid compound having 9 or more carbon atoms and 14 or less carbon atoms.

The polycondensation resin component includes polyesters, polyester-polyamides, and the like, and the polyesters are preferred, from the viewpoint of improving durability of the toner, and from the viewpoint of improving low-temperature fusing ability and heat-resistant storage property of the toner.

It is preferable that the polyester is obtained by polycondensing an alcohol component containing a dihydric or higher polyhydric alcohol and a carboxylic acid component containing a dicarboxylic or higher polycarboxylic acid compound.

The number of carbon atoms of the aliphatic diol contained in the alcohol component for the polycondensation resin component is 9 or more, and preferably 10 or more, from the viewpoint of storage property and durability. In addition, the number of carbon atoms is 14 or less, preferably 12 or less, more preferably 10 or less, and even more preferably 10, from the viewpoint of durability.

The aliphatic diol having 9 or more carbon atoms and 14 or less carbon atoms includes 1,9-nonanediol, 1,10-decanediol, 1,12-dodecanediol, and 1,14-tetradecanediol, and the like, and linear α,ω-alkanediols are preferred, one or two members selected from 1,10-decanediol and 1,12-dodecanediol are more preferred, and 1,10-decanediol is even more preferred, from the viewpoint of increasing crystallinity of the composite resin, thereby increasing low-temperature fusing ability and storage property.

The content of the aliphatic diol having 9 or more carbon atoms and 14 or less carbon atoms is preferably 70% by mol or more, more preferably 90% by mol or more, and even more preferably 95% by mol or more, and preferably 100% by mol or less, more preferably substantially 100% by mol, and even more preferably 100% by mol, of the alcohol component, from the viewpoint of increasing low-temperature fusing ability, storage property, and durability. Further, the proportion of one kind out of the aliphatic diol having 9 or more carbon atoms and 14 or less carbon atoms occupying in the alcohol component is preferably 50% by mol or more, more preferably 70% by mol or more, even more preferably 90% by mol or more, and even more preferably 95% by mol or more, and preferably 100% by mol or less, more preferably substantially 100% by mol, and even more preferably 100% by mol, from the viewpoint of increasing crystallinity of the composite resin, thereby increasing low-temperature fusing ability and storage property.

The alcohol component may contain a polyhydric alcohol other than the aliphatic diol having 9 or more carbon atoms and 14 or less carbon atoms, which includes aromatic diols such as an alkylene oxide adduct of bisphenol A represented by the formula (I):

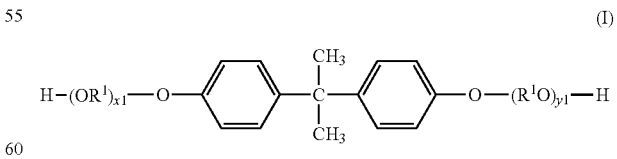

(I)

wherein $R^1O$ and $OR^1$ are an oxyalkylene group, wherein $R^1$ is an ethylene group and/or a propylene group; and each of x1 and y1 is a positive number showing an average number of moles of alkylene oxide added, wherein a value of the sum of x1 and y1 is preferably 1 or more, and more preferably 1.5 or more, and preferably 16 or less, more preferably 8 or less, and even more preferably 4 or less; and trihydric or higher polyhydric alcohols such as glycerol, pentaerythritol, trimethylolpropane, sorbitol, and 1,4-sorbitan.

The number of carbon atoms of the aliphatic dicarboxylic acid compound contained in the carboxylic acid component for the polycondensation resin is 9 or more, and preferably 10 or more, from the viewpoint of storage property and durability. Also, the number of carbon atoms is 14 or less, preferably 12 or less, and more preferably 10, from the same viewpoint.

The aliphatic dicarboxylic acid compound having 9 or more carbon atoms and 14 or less carbon atoms is preferably linear α,ω-alkanedicarboxylic acid compounds, which include azelaic acid, sebacic acid, dodecanedioic acid, tetradecanedioic acid, and the like, from the viewpoint of increasing crystallinity of the composite resin, thereby increasing low-temperature fusing ability and storage property, and the aliphatic dicarboxylic acid compound is preferably one or two members selected from sebacic acid and dodecanedioic acid, and more preferably sebacic acid, from the viewpoint of improving storage property and durability of the toner. Here, the dicarboxylic acid compound refers to dicarboxylic acids, anhydrides thereof, and alkyl esters thereof having 1 or more carbon atoms and 3 or less carbon atoms, among which the dicarboxylic acids are preferred. The number of carbon atoms of the aliphatic dicarboxylic acid compound refers to the number of carbon atoms containing the dicarboxylic acid moiety, and does not include the alkyl ester moiety.

The carboxylic acid component may contain a polycarboxylic acid compound other than the aliphatic dicarboxylic acid compound having 9 or more carbon atoms and 14 or less carbon atoms, and the polycarboxylic acid compound includes aliphatic dicarboxylic acids such as oxalic acid, malonic acid, maleic acid, fumaric acid, citraconic acid, itaconic acid, glutaconic acid, succinic acid, adipic acid, succinic acid substituted with an alkyl group having 1 or more carbon atoms and 30 or less carbon atoms or an alkenyl group having 2 or more carbon atoms and 30 or less carbon atoms; aromatic dicarboxylic acids such as phthalic acid, isophthalic acid, and terephthalic acid; alicyclic dicarboxylic acids such as cyclohexanedicarboxylic acid; aromatic tricarboxylic or higher polycarboxylic acids such as trimellitic acid, 2,5,7-naphthalenetricarboxylic acid, and pyromellitic acid; acid anhydrides thereof, and alkyl esters thereof having 1 or more carbon atoms and 3 or more carbon atoms.

The content of the aliphatic dicarboxylic acid compound having 9 or more carbon atoms and 14 or less carbon atoms is preferably 70% by mol or more, more preferably 90% by mol or more, and even more preferably 95% by mol or more, and preferably 100% by mol or less, more preferably substantially 100% by mol, and even more preferably 100% by mol, of a total amount of the dicarboxylic or higher polycarboxylic acid compound in the carboxylic acid component, from the viewpoint of low-temperature fusing ability, storage property, and durability.

The content of the aliphatic dicarboxylic acid compound having 9 or more carbon atoms and 14 or less carbon atoms is preferably 70% by mol or more, more preferably 90% by mol or more, and even more preferably 95% by mol or more, and preferably 100% by mol or less, more preferably substantially 100% by mol, and even more preferably 100% by mol, of the carboxylic acid component, from the viewpoint of low-temperature fusing ability, storage property, and durability.

In addition, the alcohol component may contain a monohydric alcohol, and the carboxylic acid component may contain a monocarboxylic acid compound in proper amounts, from the viewpoint of adjusting molecular weight, or the like.

Here, in the present specification, the dually reactive monomer described later is not included in the calculations of the contents of the alcohol component and the carboxylic acid component.

A total number of moles of the aliphatic dicarboxylic acid compound having 9 or more carbon atoms and 14 or less carbon atoms and the aliphatic diol having 9 or more carbon atoms and 14 or less carbon atoms is preferably 80% by mol or more, more preferably 90% by mol or more, even more preferably 93% by mol or more, even more preferably 95% by mol or more, and even more preferably 97% by mol or more, and preferably 100% by mol or less, more preferably substantially 100% by mol, and even more preferably 100% by mol, of a total number of moles of the carboxylic acid component and the alcohol component which are raw material monomers for the polycondensation resin component, from the viewpoint of increasing low-temperature fusing ability, storage property, and durability.

A total number of moles of the aliphatic dicarboxylic acid compound having 9 or more carbon atoms and 14 or less carbon atoms and the aliphatic diol having 9 or more carbon atoms and 14 or less carbon atoms is preferably 80% by mol or more, more preferably 90% by mol or more, and even more preferably 95% by mol or more, and preferably 100% by mol or less, more preferably substantially 100% by mol, and even more preferably 100% by mol, of a total number of moles of the dicarboxylic or higher polycarboxylic acid compound in the carboxylic acid component and the dihydric or higher polyhydric alcohols in the alcohol component which are raw material monomers for the polycondensation resin component, from the viewpoint of increasing low-temperature fusing ability, storage property, and durability.

The equivalent ratio of the carboxylic acid component to the alcohol component in the polycondensation resin component (COOH group or groups/OH group or groups) is preferably 0.6 or more, and more preferably 0.7 or more, and preferably 1.3 or less, and more preferably 1.1 or less, from the viewpoint of adjusting a softening point of the composite resin.

The polycondensation reaction of the raw material monomers for the polycondensation resin component can be carried out in an inert gas atmosphere at a temperature of 160° C. or higher and 230° C. or lower or so, optionally in the presence of an esterification catalyst, a polymerization inhibitor or the like. The esterification catalyst includes tin compounds such as dibutyltin oxide and tin(II) 2-ethylhexanoate; titanium compounds such as titanium diisopropylate bistriethanolaminate; and the like, and an esterification promoter which can be used together with the esterification catalyst includes gallic acid, and the like. The amount of the esterification catalyst used is preferably 0.01 parts by mass or more, and more preferably 0.1 parts by mass or more, and preferably 1.5 parts by mass or less, and more preferably 1.0 part by mass or less, based on 100 parts by mass of a total amount of the alcohol component and the carboxylic acid component. The amount of the esterification promoter used is preferably 0.001 parts by mass or more, and more preferably 0.01 parts by mass or more, and preferably 0.5 parts by mass or less, and more preferably 0.1 parts by mass or less, based on 100 parts by mass of a total amount of the alcohol component and the carboxylic acid component.

As the raw material monomers for the styrenic resin component, at least styrene or a styrene derivative such as α-methylstyrene or vinyltoluene (hereinafter, the styrene and styrene derivatives are collectively referred to as "styrenic compound") is used.

The content of the styrenic compound is preferably 70% by mass or more, more preferably 90% by mass or more, and even more preferably 95% by mass or more, and preferably 100% by mass or less, more preferably substantially 100% by mass, and even more preferably 100% by mass, of the raw material monomers for the styrenic resin component, from the viewpoint of improving low-temperature fusing ability, storage property, and durability of the toner.

The raw material monomers for the styrenic resin component to be used other than the styrenic compound include alkyl (meth)acrylates; ethylenically unsaturated monoolefins such as ethylene and propylene; diolefins such as butadiene; halovinyls such as vinyl chloride; vinyl esters such as vinyl acetate and vinyl propionate; ethylenically monocarboxylic acid esters such as dimethylaminoethyl (meth)acrylate; vinyl ethers such as vinyl methyl ether; vinylidene halides such as vinylidene chloride; N-vinyl compounds such as N-vinylpyrrolidone; and the like.

The raw material monomers for the styrenic resin component to be used other than the styrenic compound can be used in combination of two or more kinds. The term "(meth)acrylate" as used herein means acrylate and/or methacrylate.

Among the raw material monomers for the styrenic resin component to be used other than the styrenic compound, alkyl (meth)acrylates are preferred, from the viewpoint of improving low-temperature fusing ability of the toner. The number of carbon atoms of the alkyl group in the alkyl (meth)acrylate is preferably 1 or more, and more preferably 8 or more, and preferably 22 or less, and more preferably 18 or less, from the above viewpoint. Here, the number of carbon atoms of the alkyl ester refers to the number of carbon atoms derived from the alcohol component constituting the ester.

Specific examples of the alkyl (meth)acrylate include methyl (meth)acrylate, ethyl (meth)acrylate, (iso)propyl (meth)acrylate, 2-hydroxyethyl (meth)acrylate, (iso or tertiary)butyl (meth)acrylate, 2-ethylhexyl (meth)acrylate, (iso)octyl (meth)acrylate, (iso)decyl (meth)acrylate, (iso) stearyl (meth)acrylate, and the like. Here, the expression "(iso or tertiary)" or "(iso)" means to embrace both cases where these groups are present and cases where they are absent, and in the cases where these groups are absent, they are normal form. Also, the expression "(meth)acrylate" means to embrace both acrylate and methacrylate.

The content of the alkyl (meth)acrylate is preferably 30% by mass or less, more preferably 20% by mass or less, and even more preferably 10% by mass or less, and preferably 0% by mass or more, and more preferably 0% by mass, of the raw material monomers for the styrenic resin component, from the viewpoint of improving durability and storage property of the toner.

Here, a resin obtained by subjecting raw material monomers containing a styrenic compound and an alkyl (meth) acrylate to addition polymerization is also referred to as a styrene-(meth)acrylic resin.

The addition polymerization reaction of the raw material monomers for the styrenic resin component can be carried out, for example, according to a conventional method, in the presence of a polymerization initiator such as dicumyl peroxide, a crosslinking agent or the like, in the presence of an organic solvent or in the absence of a solvent, and the temperature conditions are preferably 110° C. or higher, and more preferably 140° C. or higher, and preferably 200° C. or lower, and more preferably 170° C. or lower.

When an organic solvent is used during the addition polymerization reaction, xylene, toluene, methyl ethyl ketone, acetone or the like can be used. The amount of the organic solvent used is preferably 10 parts by mass or more and 50 parts by mass or less, based on 100 parts by mass of the raw material monomers for the styrenic resin component.

The glass transition temperature (Tg) of the styrenic resin component is preferably 60° C. or higher, more preferably 80° C. or higher, and even more preferably 90° C. or higher, and preferably 130° C. or lower, more preferably 120° C. or lower, and even more preferably 110° C. or lower, from the viewpoint of improving low-temperature fusing ability, storage property, and durability of the toner.

As to Tg of the styrenic resin component, a value obtained by a calculation from the following formula (1) based on Tgn of a homopolymer of each of the monomers constituting each polymer, in accordance with Fox's formula (T. G. Fox, Bull. Am. Physics Soc., 1(3), 123 (1956)), an empirical formula for predicting Tg which is a thermal additive formula in a case of a polymer, is used.

$$1/Tg = \Sigma(Wn/Tgn) \quad (1)$$

In the formula, Tgn is Tg expressed in absolute temperature for a homopolymer of each of the monomer components; and Wn is a mass percentage of each of the monomer components.

The dually reactive monomer described later as used herein is not to be included in the calculation for the content of the styrenic resin component, and not used in the calculation for Tg of the styrenic resin component.

In the calculation of the glass transition temperature (Tg) according to the Fox's formula usable in Examples of the present invention, Tgn of styrene of 373K (100° C.) and Tgn of 2-ethylhexyl acrylate of 223K (−50° C.) are used.

It is preferable in the crystalline composite resin C that the polycondensation resin component and the styrenic resin component are bonded directly or via a linking group. The linking group includes dually reactive monomers described later, compounds derived from chain transfer agents, other resins, and the like.

The crystalline composite resin C is preferably in a state that the polycondensation resin component and the styrenic resin component mentioned above are dispersed in each other, and the dispersion state mentioned above can be evaluated by a difference between glass transition temperatures (Tg) of the crystalline composite resin C measured by the method described in Examples and a calculated value according to the above Fox's formula as described below.

In other words, although the crystalline composite resin C in the present invention is a crystalline resin, the crystalline composite resin includes amorphous moieties derived from the styrenic resin component and the polycondensation resin component, and has a Tg ascribed to the styrenic resin component and a Tg ascribed to the polycondensation resin component. Although the Tg of the styrenic resin component and the Tg of the polycondensation resin component in the composite resin are distinctly measured values, as the degree of dispersion of the polycondensation resin component and the styrenic resin component increases, both the Tg's approximate each other; therefore, when the polycondensation resin component and the styrenic resin component are dispersed to a nearly homogeneous state, both the Tg's overlap with each other, and the measured values are nearly a single value.

Therefore, in a state that the styrenic resin component and the polycondensation resin component are dispersed with each other, the Tg of the composite resin measured under the measurement conditions described later would take a value different from a Tg calculated by the Fox's formula of the above styrenic resin component. Specifically, the absolute value of a difference in a glass transition temperature of the crystalline composite resin C and a glass transition temperature of the styrenic resin component in the crystalline composite resin C calculated according to Fox's formula is preferably 10° C. or more, more preferably 30° C. or more, and even more preferably 50° C. or more, and preferably 120° C. or less. Generally, since a Tg of the polycondensation resin component is lower than a Tg of the styrenic resin component, the measured value of Tg of the composite resin is more likely to be lower than Tg of the calculated value of the styrenic resin component.

The crystalline composite resin C mentioned above can be obtained, for example, by (1) a method of polycondensing raw material monomers for a polycondensation resin component in the presence of a styrenic resin having a carboxy group or a hydroxyl group (the carboxy group or hydroxyl group derived from a dually reactive monomer or a chain transfer agent described later can be used); (2) a method of subjecting raw material monomers for a styrenic resin component to addition polymerization in the presence of a polycondensation resin having a reactive unsaturated bond; or the like.

It is preferable that the crystalline composite resin C is a resin obtained from the raw material monomers for the polycondensation resin component and the raw material monomers for the styrenic resin component, and further a dually reactive monomer, capable of reacting with both of the raw material monomers for the polycondensation resin component and the raw material monomers for the styrenic resin component (a hybrid resin), from the viewpoint of improving low-temperature fusing ability, storage property, and durability of the toner. Therefore, upon the polymerization of the raw material monomers for the polycondensation resin component and the raw material monomers for the styrenic resin component to obtain a crystalline composite resin C, it is preferable that the polycondensation reaction and/or the addition polymerization reaction is carried out in the presence of the dually reactive monomer. By the presence of the dually reactive monomer, the crystalline composite resin C is a resin in which the polycondensation resin component and the styrenic resin component are bound via a constituting unit derived from the dually reactive monomer (a hybrid resin), whereby the polycondensation resin component and the styrenic resin component are more finely and homogeneously dispersed.

Specifically, it is preferable that the crystalline composite resin C is a resin obtained by polymerizing (i) raw material monomers for a polycondensation resin component, containing an alcohol component containing an aliphatic diol having 9 or more carbon atoms and 14 or less carbon atoms and a carboxylic acid component containing an aliphatic dicarboxylic acid compound having 9 or more carbon atoms and 14 or less carbon atoms; (ii) raw material monomers for a styrenic resin component; and (iii) a dually reactive monomer capable of reacting with both of the raw material monomers for the polycondensation resin component and the raw material monomers for the styrenic resin component.

It is preferable that the dually reactive monomer is a compound having in its molecule at least one functional group selected from the group consisting of a hydroxyl group, a carboxy group, an epoxy group, a primary amino group and a secondary amino group, preferably a hydroxyl group and/or a carboxy group, and more preferably a carboxy group, and an ethylenically unsaturated bond. By using the dually reactive monomer described above, dispersibility of the resin forming a dispersion phase can be even more improved. The dually reactive monomer is preferably at least one member selected from the group consisting of acrylic acid, methacrylic acid, fumaric acid, maleic acid, and maleic anhydride, and the dually reactive monomer is more preferably acrylic acid, methacrylic acid or fumaric acid, from the viewpoint of reactivities of the polycondensation reaction and the addition polymerization reaction. However, when used together with a polymerization inhibitor, a polycarboxylic acid compound having an ethylenically unsaturated bond such as fumaric acid functions as raw material monomers for a polycondensation resin component. In this case, fumaric acid or the like is a raw material monomer for the polycondensation resin component, not a dually reactive monomer.

The amount of the dually reactive monomer used, based on 100 mol in a total of the alcohol component for the polycondensation resin component, is preferably 1 mol or more, and more preferably 2 mol or more, from the viewpoint of low-temperature fusing ability. In addition, the amount used is preferably 30 mol or less, more preferably 20 mol or less, even more preferably 15 mol or less, even more preferably 10 mol or less, and even more preferably 5 mol or less, from the viewpoint of enhancing dispersibility between the styrenic resin component and the polycondensation resin component, thereby improving durability and storage property of the toner.

In addition, the amount of the dually reactive monomer used, based on 100 parts by mass in a total of the raw material monomers for the styrenic resin component, is preferably 1 part by mass or more, and more preferably 2 parts by mass or more, from the viewpoint of low-temperature fusing ability. In addition, the amount used is preferably 30 parts by mass or less, more preferably 20 parts by mass or less, even more preferably 15 parts by mass or less, and even more preferably 10 parts by mass or less, from the viewpoint of enhancing dispersibility between the styrenic resin component and the polycondensation resin component, thereby improving durability and storage property of the toner. Here, the total of the raw material monomers for the styrenic resin component includes a polymerization initiator.

Specifically, it is preferable that a hybrid resin obtained by using a dually reactive monomer is produced by the following method. It is preferable that the dually reactive monomer is used in the addition polymerization reaction together with the raw material monomers for the styrenic resin component, from the viewpoint of improving durability, low-temperature fusing ability, and storage property of the toner.

(i) Method including the steps of (A) carrying out a polycondensation reaction of raw material monomers for a polycondensation resin component; and thereafter (B) carrying out an addition polymerization reaction of raw materials monomers for a styrenic resin component and a dually reactive monomer In this method, the step (A) is carried out under reaction temperature conditions appropriate for a polycondensation reaction, a reaction temperature is then lowered, and the step (B) is carried out under temperature conditions appropriate for an addition polymerization reaction. It is preferable that the raw material monomers for the styrenic resin component and the dually reactive monomer are added to a reaction system at a temperature appropriate for an addition polymerization reaction. The dually reactive monomer reacts in the addition polymerization reaction and at the same time reacts with the polycondensation resin component.

After the step (B), a reaction temperature is raised again, raw material monomers for a polycondensation resin component such as a trivalent or higher polyvalent monomer serving as a crosslinking agent are optionally added to the polymerization system, whereby the polycondensation reaction of the step (A) and the reaction with the dually reactive monomer can be further progressed.

(ii) Method including the steps of (B) carrying out an addition polymerization reaction of raw material monomers for a styrenic resin component and a dually reactive monomer, and thereafter (A) carrying out a polycondensation reaction of raw material monomers for a polycondensation resin component In this method, the step (B) is carried out under reaction temperature conditions appropriate for an addition polymerization reaction, a reaction temperature is then raised, and the step (A) a polycondensation reaction is carried out under reaction temperature conditions appropriate for the polycondensation reaction. The dually reactive monomer is also involved in a polycondensation reaction as well as the addition polymerization reaction.

The raw material monomers for the polycondensation resin component may be present in a reaction system during the addition polymerization reaction, or the raw material monomers for the polycondensation resin component may be added to a reaction system under temperatures conditions appropriate for the polycondensation reaction. In the former case, the progress of the polycondensation reaction can be adjusted by adding an esterification catalyst at a temperature appropriate for the polycondensation reaction.

(iii) Method including the steps of carrying out reactions under conditions of concurrently progressing the step (A) a polycondensation reaction of raw material monomers for a polycondensation resin component; and the step (B) an addition polymerization reaction of raw materials monomers for a styrenic resin component and a dually reactive monomer In this method, it is preferable that the steps (A) and (B) are carried out under reaction temperature conditions appropriate for an addition polymerization reaction, a reaction temperature is raised, and under temperature conditions appropriate for the polycondensation reaction, raw material monomers for the polycondensation resin component of a trivalent or higher polyvalent monomer serving as a crosslinking agent are optionally added to a polymerization system, and the step (A) a polycondensation reaction is further carried out. During the process, the polycondensation reaction alone can be progressed by adding a radical polymerization inhibitor under temperature conditions appropriate for the polycondensation reaction. The dually reactive monomer is also involved in a polycondensation reaction as well as the addition polymerization reaction.

In the above method (i), a polycondensation resin that is previously polymerized may be used in place of the step (A) carrying out a polycondensation reaction. In the above method (iii), when a reaction is carried out under conditions that the steps (A) and (B) are concurrently progressed, a mixture containing raw material monomers for the styrenic resin component can be added dropwise to a mixture containing raw material monomers for the polycondensation resin component to react.

It is preferable that the above methods (i) to (iii) are carried out in the same vessel.

A mass ratio of the polycondensation resin component to the styrenic resin component in the crystalline composite resin C (polycondensation resin component/styrenic resin component) is preferably 55/45 or more, more preferably 70/30 or more, even more preferably 80/20 or more, and even more preferably 85/15 or more, from the viewpoint of storage property. Also, the mass ratio is preferably 95/5 or less, and more preferably 92/8 or less, from the viewpoint of durability. Here, in the above calculation, the mass of the polycondensation resin component is an amount obtained by removing the amount of reaction water dehydrated by the polycondensation reaction from the mass of the raw material monomers for the polycondensation resin used, and the amount of the dually reactive monomer is included in the amount of the raw material monomers for the polycondensation resin component. In addition, the amount of the styrenic resin component is the amount of the raw material monomers for the styrenic resin component, and the amount of the polymerization initiator is not included in the amount of the raw material monomers for the styrenic resin component.

The softening point of the crystalline composite resin C is preferably 60° C. or higher, more preferably 70° C. or higher, even more preferably 75° C. or higher, and even more preferably 80° C. or higher, from the viewpoint of improving storage property of the toner. In addition, the softening point is preferably 140° C. or lower, more preferably 120° C. or lower, even more preferably 110° C. or lower, and even more preferably 100° C. or lower, from the viewpoint of improving low-temperature fusing ability of the toner.

In addition, the melting point (highest temperature of endothermic peak) of the crystalline composite resin C is preferably 55° C. or higher, more preferably 65° C. or higher, and even more preferably 70° C. or higher, from the viewpoint of improving durability of the toner and from the viewpoint of improving storage property of the toner. Also, the melting point is preferably 140° C. or lower, more preferably 120° C. or lower, even more preferably 110° C. or lower, and even more preferably 100° C. or lower, from the viewpoint of improving low-temperature fusing ability of the toner.

The softening point and the melting point of the crystalline composite resin C can be adjusted by adjusting composition of raw material monomers, a polymerization initiator, molecular weights, an amount of a catalyst or the like, or selecting reaction conditions.

In addition, the glass transition temperature (Tg) of the crystalline composite resin C is preferably −10° C. or higher, more preferably 0° C. or higher, and even more preferably 10° C. or higher, from the viewpoint of improving durability of the toner and from the viewpoint of improving storage property of the toner. Also, the glass transition temperature is preferably 60° C. or lower, more preferably 50° C. or lower, and even more preferably 45° C. or lower, from the viewpoint of improving low-temperature fusing ability of the toner.

The toner of the present invention may contain a crystalline resin other than the crystalline composite resin C, but the content of the above crystalline composite resin C in the crystalline resin is preferably 80% by mass or more, more preferably 90% by mass or more, and even more preferably 95% by mass or more, and preferably 100% by mass or less, more preferably substantially 100% by mass, and even more preferably 100% by mass, from the viewpoint of improving durability of the toner and from the viewpoint of improving heat-resistant storage property of the toner.

The content of the crystalline composite resin C in the resin binder is preferably 3% by mass or more, more preferably 5% by mass or more, even more preferably 7% by mass or more, and even more preferably 8% by mass or more, from the viewpoint of improving low-temperature fusing ability of the toner. Also, the content is preferably 40% by mass or less, more preferably 30% by mass or less, even more preferably 20% by mass or less, and even more preferably 15% by mass or less, from the viewpoint of improving durability of the toner and from the viewpoint of improving storage property of the toner.

It is preferable that the amorphous polyester A in the present invention is obtained by polycondensing an alcohol component containing a dihydric or higher polyhydric alcohol and a carboxylic acid component containing a dicarboxylic or higher polycarboxylic acid compound.

The dihydric alcohol includes a diol having preferably 2 or more carbon atoms, and preferably 20 or less carbon atoms, and more preferably 15 or less carbon atoms; an alkylene oxide adduct of bisphenol A represented by the formula (I):

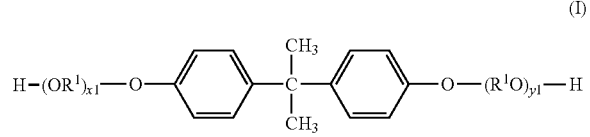

wherein $R^1O$ and $OR^1$ are an oxyalkylene group, wherein $R^1$ is an ethylene group and/or a propylene group; and each of x1 and y1 is a positive number showing an average number of moles of alkylene oxide added, wherein a value of the sum of x1 and y1 is preferably 1 or more, and more preferably 1.5 or more, and preferably 16 or less, more preferably 8 or less, and even more preferably 4 or less, and the like. Specific examples of the dihydric alcohol having 2 or more carbon atoms and 20 or less carbon atoms include ethylene glycol, 1,2-propanediol, 1,3-propanediol, 1,4-butanediol, 1,6-hexanediol, bisphenol A, hydrogenated bisphenol A and the like.

It is preferable that the alcohol component is the alkylene oxide adduct of bisphenol A represented by the formula (I), from the viewpoint of improving durability and heat-resistant storage property of the toner. The content of the alkylene oxide adduct of bisphenol A represented by the formula (I) is preferably 50% by mol or more, more preferably 70% by mol or more, and even more preferably 90% by mol or more, and preferably 100% by mol or less, more preferably substantially 100% by mol, and even more preferably 100% by mol, of the alcohol component, from the viewpoint of improving durability and heat-resistant storage property of the toner.

The trihydric or higher polyhydric alcohol includes trihydric or higher polyhydric alcohols having preferably 3 or more carbon atoms, and preferably 20 or less carbon atoms, and more preferably 10 or less carbon atoms. Specific examples include sorbitol, 1,4-sorbitan, pentaerythritol, glycerol, trimethylolpropane, and the like.

The dicarboxylic acid compound includes, for example, dicarboxylic acids having preferably 3 or more carbon atoms, and more preferably 4 or more carbon atoms, and preferably 30 or less carbon atoms, more preferably 20 or less carbon atoms, and even more preferably 10 or less carbon atoms, and acid anhydrides thereof, derivatives thereof such as alkyl esters having 1 or more carbon atoms and 3 or less carbon atoms, and the like. Specific examples include aromatic dicarboxylic acids such as phthalic acid, isophthalic acid, and terephthalic acid; and aliphatic dicarboxylic acids such as fumaric acid, maleic acid, succinic acid, glutaric acid, adipic acid, sebacic acid, and succinic acid substituted with an alkyl group having 1 or more carbon atoms and 30 or less carbon atoms or with an alkenyl group having 2 or more carbon atoms and 30 or less carbon atoms. The succinic acid substituted with an alkyl group having 1 or more carbon atoms and 30 or less carbon atoms or with an alkenyl group having 2 or more carbon atoms and 30 or less carbon atoms is considered as an aliphatic dicarboxylic acid having 4 carbon atoms.

The tricarboxylic or higher polycarboxylic acid compound includes, for example, tricarboxylic or higher polycarboxylic acids having preferably 4 or more carbon atoms, more preferably 6 or more carbon atoms, and even more preferably 9 or more carbon atoms, and preferably 30 or less carbon atoms, more preferably 20 or less carbon atoms, and even more preferably 10 or less carbon atoms, and acid anhydrides thereof, derivatives thereof such as alkyl esters having 1 or more carbon atoms and 3 or less carbon atoms, and the like. Specific examples include 1,2,4-benzenetricarboxylic acid (trimellitic acid), 1,2,4,5-benzenetetracarboxylic acid (pyromellitic acid), and the like.

The carboxylic acid component contains preferably at least one member selected from the group consisting of terephthalic acid, succinic acid substituted with an alkyl group or alkenyl group having 2 or more carbon atoms and 20 or less carbon atoms, and trimellitic anhydride, and contains more preferably terephthalic acid, from the viewpoint of improving durability and storage property of the toner.

A total content of terephthalic acid, succinic acid substituted with an alkyl group or alkenyl group having 2 or more carbon atoms and 20 or less carbon atoms, and trimellitic anhydride is preferably 60% by mol or more, more preferably 80% by mol or more, and even more preferably 90% by mol or more, and preferably 100% by mol or less, of the carboxylic acid component.

Here, the alcohol component may contain a monohydric alcohol, and the carboxylic acid component may contain a monocarboxylic acid compound in proper amounts, from the viewpoint of adjusting the softening point of the polyester.

The equivalent ratio of the carboxylic acid component to the alcohol component in the polyester (COOH group or groups/OH group or groups) is preferably 0.7 or more, and more preferably 0.8 or more, and preferably 1.3 or less, and more preferably 1.2 or less, from the viewpoint of adjusting the softening point of the polyester.

The amorphous polyester A can be produced, for example, by polycondensation of the alcohol component and the carboxylic acid component in an inert gas atmosphere at a temperature of 180° C. or higher and 250° C. or lower or so, optionally in the presence of an esterification catalyst, a polymerization inhibitor or the like. The esterification catalyst includes tin compounds such as dibutyltin oxide and tin(II) 2-ethylhexanoate; titanium compounds such as titanium diisopropylate bistriethanolaminate; and the like. The esterification promoter which can be used together with the esterification catalyst includes gallic acid, and the like. The amount of the esterification catalyst used is preferably 0.01 parts by mass or more, and more preferably 0.1 parts by mass or more, and preferably 1 part by mass or less, and more preferably 0.6 parts by mass or less, based on 100 parts by mass of a total amount of the alcohol component and the carboxylic acid component. The amount of the esterification promoter used is preferably 0.001 parts by mass or more, and more preferably 0.01 parts by mass or more, and preferably 0.5 parts by mass or less, and more preferably 0.1 parts by mass or less, based on 100 parts by mass of a total amount of the alcohol component and the carboxylic acid component.

The softening point of the amorphous polyester A is preferably 90° C. or higher, more preferably 100° C. or higher, and even more preferably 105° C. or higher, from the viewpoint of improving durability and storage property of the toner. In addition, the softening point is preferably 150° C. or lower, more preferably 140° C. or lower, and even more preferably 130° C. or lower, from the viewpoint of improving low-temperature fusing ability of the toner. When two or more kinds of amorphous polyesters A are contained, it is preferable that a weighted average of the softening point is within the above range.

In addition, in the present invention, it is preferable that the amorphous polyester A contains two kinds of amorphous polyesters having different softening points, from the viewpoint of a balance between low-temperature fusing ability, storage property, and durability of the toner. The difference in softening points is preferably 5° C. or more, and more preferably 10° C. or more, and preferably 40° C. or less, and more preferably 30° C. or less. Among the two kinds of the amorphous polyesters A, the softening point of the amorphous polyester AL having a lower softening point is preferably 80° C. or higher, more preferably 95° C. or higher, and even more preferably 105° C. or higher, and preferably 135° C. or lower, more preferably 120° C. or lower, and even more preferably lower than 115° C., from the viewpoint of low-temperature fusing ability and storage property of the toner. The softening point of the amorphous polyester AH having a higher softening point is preferably 110° C. or higher, more preferably 115° C. or higher, and even more preferably 118° C. or higher, and preferably 170° C. or lower, more preferably 160° C. or lower, and even more preferably 150° C. or lower, from the viewpoint of improving durability of the toner.

Here, when the amorphous polyester A contains two kinds of amorphous polyesters having different softening points, it is preferable that the amorphous polyester AL having a lower softening point is a resin obtained by polycondensing an alcohol component containing a compound of the above formula (I) in which $R^1$ is an ethylene group, which is specifically an ethylene oxide adduct of bisphenol A represented by the formula (II):

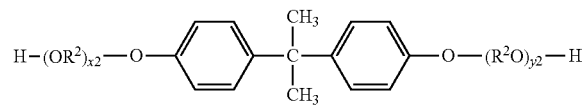

(II)

wherein $R^2O$ and $OR^2$ are an oxyethylene group; each of x2 and y2 is a positive number showing an average number of moles of ethylene oxide added, wherein a value of the sum of x2 and y2 is preferably 1 or more, and more preferably 1.5 or more, and preferably 16 or less, more preferably 8 or less, and even more preferably 4 or less, and a carboxylic acid component.

Since a polycondensate using the ethylene oxide adduct of bisphenol A has higher reactivity and lower viscosity than the polycondensate using a propylene oxide adduct, the polycondensate using the ethylene oxide adduct is more likely to be polymerized, when the polycondensates of the same softening point are compared. Therefore, by using an alcohol component containing the ethylene oxide adduct in an amorphous polyester having a lower softening point, a difference in molecular weights of the resin having a lower softening point and the resin having a higher softening point can be reduced, so that a crystalline resin can be more evenly dispersed in the resin binder. Therefore, it is considered that storage property and durability of the toner is improved. The content of the ethylene oxide adduct of bisphenol A represented by the formula (II) is preferably 55% by mol or more, more preferably 60% by mol or more, and even more preferably 62% by mol or more, and preferably 90% by mol or less, more preferably 80% by mol or less, and even more preferably 70% by mol or less, of the alcohol component for the amorphous polyester AL. As other alcohol component, it is preferable that the alcohol component contains a propylene oxide adduct of bisphenol A (a compound of the above formula (I) in which $R^1$ is a propylene group).

On the other hand, the amorphous polyester AH having a higher softening point is a resin obtained by polycondensing an alcohol component and a carboxylic acid component, and the content of the ethylene oxide adduct of bisphenol A represented by the formula (11) is preferably less than 55% by mol, and more preferably 53% by mol or less, and preferably 20% by mol or more, more preferably 30% by mol or more, and even more preferably 40% by mol or more, of the alcohol component, from the viewpoint of storage property and durability of the toner. As other component, it is preferable that the alcohol component contains a propylene oxide adduct of bisphenol A, in the same manner as in the amorphous polyester AL.

The preferred carboxylic acid components for the amorphous polyester AH and the amorphous polyester AL are preferably those described in the amorphous polyester A mentioned above, and the preferred ranges are also the same.

A mass ratio of the amorphous polyester AH to the amorphous polyester AL (amorphous polyester AH/amorphous polyester AL) is preferably 1/9 or more, more preferably 2/8 or more, and even more preferably 3/7 or more, from the viewpoint of durability and storage property, and the mass ratio is preferably 9/1 or less, more preferably 8/2 or less, even more preferably 5/5 or less, and even more preferably 4/6 or less, from the viewpoint of low-temperature fusing ability.

The highest temperature of endothermic peak of the amorphous polyester A is preferably 50° C. or higher, more preferably 55° C. or higher, and even more preferably 60° C. or higher, from the viewpoint of improving durability and storage property of the toner. In addition, the highest temperature of endothermic peak is preferably 100° C. or lower, more preferably 90° C. or lower, and even more preferably 80° C. or lower, from the viewpoint of improving low-temperature fusing ability of the toner.

The glass transition temperature of the amorphous polyester A is preferably 50° C. or higher, more preferably 55° C. or higher, and even more preferably 60° C. or higher, from the viewpoint of improving durability and storage property of the toner. In addition, the glass transition temperature is preferably 80° C. or lower, more preferably 75° C. or lower, and even more preferably 70° C. or lower, from the viewpoint of improving low-temperature fusing ability of the toner. Here, the glass transition temperature is a physical property intrinsically owned by an amorphous phase, and is distinguished from the highest temperature of endothermic peak.

The acid value of the amorphous polyester A is preferably 40 mgKOH/g or less, more preferably 30 mgKOH/g or less, and even more preferably 20 mgKOH/g or less, and preferably 1 mgKOH/g or more, and more preferably 2 mgKOH/g or more, from the viewpoint of improving environmental stability of the electric charges of the toner.

The toner of the present invention may contain an amorphous resin other than the amorphous polyester A, including, for example, a composite resin, a vinyl resin, an epoxy resin, a polycarbonate resin, a polyurethane resin, and the like. The content of the amorphous polyester A is preferably 80% by mass or more, more preferably 90% by mass or more, and even more preferably 95% by mass or more, and preferably 100% by mass or less, more preferably substantially 100% by mass, and even more preferably 100% by mass, of the amorphous resin, from the viewpoint of improving low-temperature fusing ability, storage property, and durability of the toner.

A mass ratio of the amorphous polyester A to the crystalline composite resin C (amorphous polyester A/crystalline composite resin C) is 95/5 or less, and preferably 92/8 or less, from the viewpoint of low-temperature fusing ability. In addition, the mass ratio is 60/40 or more, preferably 70/30 or more, more preferably 80/20 or more, even more preferably 85/15 or more, and even more preferably 88/12 or more, from the viewpoint of storage property and durability.

The toner for electrophotography of the present invention may be used together as resin binders with a crystalline resin other than the crystalline composite resin C and an amorphous resin other than the amorphous polyester A within the range that would not impair the effects of the present invention. A total content of the crystalline composite resin C and the amorphous polyester A is preferably 60% by mass or more, more preferably 80% by mass or more, and even more preferably 95% by mass or more, and preferably 100% by mass or less, more preferably substantially 100% by mass, and even more preferably 100% by mass, of the resin binder, from the viewpoint of low-temperature fusing ability, heat-resistant storage property, and durability.

In the present invention, it is preferable that a solubility parameter (SP value) of the crystalline resin is appropriately departed from a solubility parameter (SP value) of the amorphous resin, from the viewpoint of improving durability of the toner and from the viewpoint of improving heat-resistant storage property of the toner. When the difference in SP values between the crystalline resin and the amorphous resin is within a specified range, it is considered that the crystalline resin is less likely to be compatible with the amorphous resin and more likely to maintain its crystalline structure, so that durability and heat-resistant storage property are improved. Therefore, the difference in SP values between the crystalline resin and the amorphous resin, and preferably a difference in SP values between the crystalline composite resin C and the amorphous polyester A is preferably 1.0 or more, and more preferably 1.2 or more. In addition, the difference is preferably 2.0 or less, from the viewpoint of increasing miscibility of the crystalline resin and the amorphous resin in the toner. When the crystalline resins and the amorphous resins are composed of two or more kinds of resins, a weighted-average is taken.

While there are some methods for measuring the above SP values or calculation methods thereof known, in the present invention, a calculation method described in "Specific Interactions and the Miscibility of Polymer Blends" (1991), Technomic Publishing Co. Inc. authored by Michael M. Collman, John F. Graf, Paul C. Painter (Pennsylvania State Univ.) is used.

In the present invention, the ester wax refers to a wax having an ester group, which includes natural ester waxes and synthetic ester waxes. The natural ester wax is preferred, from the viewpoint of improving low-temperature fusing ability and heat-resistant storage property of the toner.

The natural wax includes carnauba wax, montan ester wax, rice wax, candelilla wax, and the like, any of which may be used for the toner of the present invention. In the present invention, carnauba wax is preferred, from the viewpoint of improving low-temperature fusing ability and heat-resistant storage property of the toner.

The synthetic ester wax refers to an ester compound obtained by reaction of a carboxylic acid and an alcohol.

The number of carbon atoms of the carboxylic acid is preferably 2 or more and 30 or less, more preferably 8 or more and 30 or less, even more preferably 12 or more and 30 or less, even more preferably 12 or more and 24 or less, even more preferably 14 or more and 24 or less, and even more preferably 18 or more and 24 or less, from the viewpoint of improving low-temperature fusing ability and heat-resistant storage property of the toner.

In addition, the number of carboxyl group or carboxyl groups of the carboxylic acid may be any one of monocarboxylic, dicarboxylic, or tricarboxylic or higher polycarboxylic, and monocarboxylic is preferred, from the viewpoint of improving low-temperature fusing ability and storage property of the toner.

The carboxylic acid is preferably a fatty acid having a linear alkyl group or a linear alkenyl group, and more preferably a fatty acid having a linear alkyl group, from the same viewpoint.

The fatty acid having a linear alkyl group includes, for example, caprylic acid, capric acid, lauric acid, myristic acid, palmitic acid, stearic acid, arachic acid, behenic acid, lignoceric acid, cerotic acid, montanoic acid, melissic acid, and the like.

The number of hydroxyl group or hydroxyl groups of the alcohol may be monohydric, dihydric, or trihydric or higher polyhydric.

The number of carbon atoms of the monohydric alcohol is preferably 2 or more and 30 or less, more preferably 8 or more and 30 or less, even more preferably 12 or more and 30 or less, and even more preferably 12 or more and 24 or less, from the viewpoint of improving low-temperature fusing ability and heat-resistant storage property of the toner. In addition, the monohydric alcohol is preferably one having a linear alkyl group or alkenyl group, and more preferably one having a linear alkyl group, from the same viewpoint.

The monohydric alcohol having a linear alkyl group or alkenyl group includes, for example, lauryl alcohol, myristyl alcohol, cetyl alcohol, stearyl alcohol, arachyl alcohol, behenyl alcohol, tetracosanol, hexacosanol, octacosanol, triacontanol, and the like.

The number of carbon atoms of the dihydric alcohols is preferably 2 or more and 18 or less, and more preferably 2 or more and 10 or less, from the viewpoint of improving low-temperature fusing ability and heat-resistant storage property of the toner. In addition, an $\alpha,\omega$-linear alkanediol is preferred, from the same viewpoint.

The dihydric alcohol includes, for example, ethylene glycol, propylene glycol, 1,3-propanediol, 1,4-butanediol, 1,5-pentanediol, 1,6-hexanediol, 1,10-decanediol, and the like.

The number of carbon atoms of the trihydric or higher polyhydric alcohol is preferably 3 or more and 10 or less, and more preferably 3 or more and 5 or less, from the viewpoint of improving low-temperature fusing ability and heat-resistant storage property of the toner. In addition, the number of hydroxyl groups of the trihydric or higher polyhydric alcohol is preferably 3 or more and 6 or less, and more preferably 3 or more and 4 or less, from the same viewpoint.

The trihydric or higher polyhydric alcohol includes, for example, glycerol, trimethylolpropane, pentaerythritol, and the like, and pentaerythritol is preferred, from the viewpoint of improving low-temperature fusing ability and heat-resistant storage property of the toner.

The synthetic ester wax is preferably an ester in which a monohydric aliphatic alcohol having 14 or more carbon atoms and 24 or less carbon atoms is reacted with a fatty acid having 14 or more carbon atoms and 24 or less carbon atoms and an ester in which pentaerythritol is reacted with a fatty acid having 14 or more carbon atoms and 24 or less carbon atoms, and more preferably an ester in which a monohydric aliphatic alcohol having 18 or more carbon atoms and 24 or less carbon atoms is reacted with a fatty acid having 18 or more carbon atoms and 24 or less carbon atoms and an ester in which pentaerythritol is reacted with a fatty acid having 18 or more carbon atoms and 24 or less carbon atoms, from the viewpoint of improving low-temperature fusing ability and heat-resistant storage property of the toner.

The ester wax is preferably carnauba wax, montan wax, rice wax, an ester in which a monohydric aliphatic alcohol having 14 or more carbon atoms and 24 or less carbon atoms is reacted with a fatty acid having 14 or more carbon atoms and 24 or less carbon atoms, and an ester in which pentaerythritol is reacted with a fatty acid having 14 or more carbon atoms and 24 or less carbon atoms, more preferably carnauba wax, an ester in which a monohydric aliphatic alcohol having 18 or more carbon atoms and 24 or less carbon atoms is reacted with a fatty acid having 18 or more carbon atoms and 24 or less carbon atoms, and an ester in which pentaerythritol is reacted with a fatty acid having 18 or more carbon atoms and 24 or less carbon atoms, and even more preferably carnauba wax, from the viewpoint of improving low-temperature fusing ability and storage property of the toner.

The melting point of the ester wax is preferably 60° C. or higher, more preferably 70° C. or higher, and even more preferably 75° C. or higher, from the viewpoint of the storage property of the toner, and the melting point is preferably 100° C. or lower, more preferably 90° C. or lower, and even more preferably 85° C. or lower, from the viewpoint of low-temperature fusing ability of the toner.

The content of the ester wax is preferably 0.6 parts by mass or more, more preferably 1 part by mass or more, even more preferably 2 parts by mass or more, even more preferably 2.5 parts by mass or more, even more preferably 4 parts by mass or more, even more preferably 6 parts by mass or more, and even more preferably 8 parts by mass or more, based on 100 parts by mass of a total of the crystalline composite resin C and the amorphous polyester A, from the viewpoint of low-temperature fusing ability.

The content of the ester wax is preferably 10 parts by mass or less, more preferably 8 parts by mass or less, even more preferably 6 parts by mass or less, even more preferably 5 parts by mass or less, even more preferably 4 parts by mass, and even more preferably 2 parts by mass or less, based on 100 parts by mass of a total of the crystalline composite resin C and the amorphous polyester A, from the viewpoint of storage property.

In addition, the content of the ester wax is preferably 0.6 parts by mass or more, more preferably 1 part by mass or more, even more preferably 2 parts by mass or more, even more preferably 2.5 parts by mass or more, even more preferably 4 parts by mass or more, even more preferably 6 parts by mass or more, and even more preferably 8 parts by mass or more, based on 100 parts by mass of the resin binder, from the viewpoint of low-temperature fusing ability.

The content of the ester wax is preferably 10 parts by mass or less, more preferably 8 parts by mass or less, even more preferably 6 parts by mass or less, even more preferably 5 parts by mass or less, even more preferably 4 parts by mass or less, and even more preferably 2 parts by mass or less, based on 100 parts by mass of the resin binder, from the viewpoint of storage property.

In addition, a mass ratio of the crystalline composite resin C to the ester wax (the crystalline composite resin C/the ester wax) is 9 or less, preferably 8 or less, more preferably 7 or less, even more preferably 6 or less, even more preferably 5 or less, even more preferably 4 or less, even more preferably 2 or less, even more preferably 1 or less, and even more preferably 0.6 or less, from the viewpoint of low-temperature fusing ability.

A mass ratio of the crystalline composite resin C to the ester wax (the crystalline composite resin C/the ester wax) is 0.5 or more, preferably 0.7 or more, more preferably 1 or more, even more preferably 2 or more, even more preferably 2.5 or more, even more preferably 5 or more, and even more preferably 7 or more, from the viewpoint of storage property.

A mass ratio of the crystalline composite resin C to the ester wax (the crystalline composite resin C/the ester wax) is 0.5 or more, preferably 0.7 or more, more preferably 1 or more, even more preferably 2 or more, and even more preferably 2.5 or more, from the viewpoint of durability. Also, the mass ratio is 9 or less, preferably 8 or less, more preferably 7 or less, even more preferably 6 or less, even more preferably 5 or less, and even more preferably 4 or less, from the same viewpoint.

Therefore, a mass ratio of the crystalline composite resin C to the ester wax (the crystalline composite resin C/the ester wax) is 0.5 or more, preferably 0.7 or more, more preferably 1 or more, even more preferably 2 or more, and even more preferably 2.5 or more, from the viewpoint of low-temperature fusing ability, storage property, and durability, and the mass ratio is 9 or less, preferably 8 or less, more preferably 7 or less, even more preferably 6 or less, and even more preferably 4 or less, from the same viewpoint.

The toner of the present invention may contain a releasing agent other than the ester wax. Other releasing agents include aliphatic hydrocarbon-based waxes such as polypropylene wax, polyethylene wax, polypropylene-polyethylene copolymer wax, microcrystalline wax, paraffin waxes, and Fischer-Tropsch wax, and oxides thereof, fatty acid amides, fatty acids, higher alcohols, metal salts of fatty acids, and the like. The content of the ester wax is preferably 20% by mass or more, more preferably 30% by mass or more, even more preferably 40% by mass or more, even more preferably 50% by mass or more, even more preferably 80% by mass or more, and even more preferably 90% by mass or more, and preferably 100% by mass or less, of the releasing agent, from the viewpoint of low-temperature fusing ability, storage property, and durability.

The toner for electrophotography of the present invention may contain, in addition to the resin binder and the ester wax, a colorant, a charge control agent, and the like.

As the colorant, all of the dyes, pigments and the like which are used as colorants for toners can be used, and carbon blacks, Phthalocyanine Blue, Permanent Brown FG, Brilliant Fast Scarlet, Pigment Green B, Rhodamine-B Base, Solvent Red 49, Solvent Red 146, Solvent Blue 35, quinacridone, carmine 6B, disazo yellow, or the like can be used. The toner of the present invention may be any of black toners and color toners. As the colorant, Phthalocyanine Blue 15:3 (P.B. 15:3), Phthalocyanine Blue 15:4 (P.B. 15:4), and carbon blacks are preferred, and Phthalocyanine Blue 15:3 is more preferred, from the viewpoint of improving durability of the toner, and from the viewpoint of improving low-temperature fusing ability and heat-resistant storage property of the toner.

The content of the colorant, based on 100 parts by mass of the resin binder, is preferably 0.5 parts by mass or more, and more preferably 1 part by mass or more, from the viewpoint of improving optical density of the toner. Also, the content is preferably 10 parts by mass or less, more preferably 8 parts by mass or less, and even more preferably 7 parts by mass or less, from the viewpoint of improving durability of the toner, and from the viewpoint of improving low-temperature fusing ability and heat-resistant storage property of the toner.

The charge control agent may contain, but not particularly limited to, any of negatively chargeable charge control agents and positively chargeable charge control agents.

The positively chargeable charge control agent includes Nigrosine dyes, for example, "Nigrosine Base EX," "OIL BLACK BS," "OIL BLACK SO," "BONTRON N-01," "BONTRON N-04," "BONTRON N-07," "BONTRON N-09," "BONTRON N-11" (hereinabove manufactured by Orient Chemical Industries Co., Ltd.), and the like; triphenylmethane-based dyes containing a tertiary amine as a side chain; quaternary ammonium salt compounds, for example, "BONTRON P-51" (manufactured by Orient Chemical Industries Co., Ltd.), cetyltrimethylammonium bromide, "COPY CHARGE PX VP435" (manufactured by Clariant, Ltd.), and the like; polyamine resins, for example, "AFP-B" (manufactured by Orient Chemical Industries Co., Ltd.), and the like; imidazole derivatives, for example, "PLZ-2001," "PLZ-8001" (hereinabove manufactured by Shikoku Chemicals Corporation), and the like; styrene-acrylic resins, for example, "FCA-701PT" (manufactured by FUJIKURAKASEI CO., LTD.), and the like.

In addition, the negatively chargeable charge control agent includes metal-containing azo dyes, for example, "VARIFAST BLACK 3804," "BONTRON S-31, "BONTRON S-32," "BONTRON S-34," "BONTRON S-36" (hereinabove manufactured by Orient Chemical Industries Co., Ltd.), "AIZEN SPILON BLACK TRH," "T-77" (manufactured by Hodogaya Chemical Co., Ltd.), and the like; metal compounds of benzilic acid compounds, for example, "LR-147," "LR-297" (hereinabove manufactured by Japan Carlit Co., Ltd.); metal compounds of salicylic acid compounds, for example, "BONTRON E-81," "BONTRON E-84," "BONTRON E-88," "BONTRON E-304" (hereinabove manufactured by Orient Chemical Industries Co., Ltd.), "TN-105" (manufactured by Hodogaya Chemical Co., Ltd.), and the like; copper phthalocyanine dyes; quaternary ammonium salts, for example, "COPY CHARGE NX VP434" (manufactured by Clariant, Ltd.); nitroimidazole derivatives and the like; organometallic compounds and the like.

The content of the charge control agent, based on 100 parts by mass of the resin binder, is preferably 0.01 parts by mass or more, and more preferably 0.2 parts by mass or more, from the viewpoint of electric stability of the toner. Also, the content is preferably 10 parts by mass or less, more preferably 5 parts by mass or less, even more preferably 3 parts by mass or less, and even more preferably 2 parts by mass or less, from the same viewpoint.

In the toner of present invention, an additive such as a magnetic particulate, a fluidity improver, an electric conductivity modifier, a reinforcing filler such as a fibrous material, an antioxidant, an anti-aging agent, or a cleanability improver may be further properly used.

The toner for electrophotography of the present invention may be a toner obtained by any of the conventional known methods such as a melt-kneading method, an emulsion phase-inversion method, and a polymerization method, and a pulverized toner produced by the melt-kneading method is preferred, from the viewpoint of improving durability of the toner, and from the viewpoint of improving low-temperature fusing ability and heat-resistant storage property of the toner. Specifically, a pulverized toner obtained by a method including:

step 1: melt-kneading toner components containing a crystalline composite resin C, an amorphous polyester A and an ester wax with an open-roller type kneader; and step 2: pulverizing a kneaded product obtained is preferred.

In the step 1, the melt-kneading of the toner components containing a crystalline composite resin C, an amorphous polyester A, and an ester wax, and optionally a colorant, a charge control agent, and the like can be carried out with a known kneader, such as a closed kneader, a single-screw or twin-screw extruder, or an open-roller type kneader. It is preferable that the melt-kneading is carried out with an open-roller type kneader, from the viewpoint of being capable of efficiently and highly dispersing a resin binder with toner components including an ester wax, a colorant, a charge control agent or the like, without having to repeat kneading or use a dispersion aid.

It is preferable that the toner components such as a crystalline composite resin C, an amorphous polyester A, an ester wax, a colorant, and a charge control agent are previously mixed with a mixer such as a Henschel mixer or a ball-mill, and thereafter fed to a kneader.

The open-roller type kneader refers to a kneader of which kneading unit is an open one, not being tightly closed, and the kneading heat generated during the kneading can be easily dissipated. In addition, it is preferable that a continuous open-roller type kneader is a kneader provided with at least two rollers, and the continuous open-roller type kneader usable in the present invention is a kneader provided with two rollers having different peripheral speeds, in other words, two rollers of a high-rotation roller having a high peripheral speed and a low-rotation roller having a low peripheral speed. In the present invention, it is preferable that the high-rotation roller is a heat roller, and that the low-rotation roller is a cooling roller, from the viewpoint of improving dispersibility of additives such as an ester wax, a colorant, and a charge control agent in the toner, from the viewpoint of reducing mechanical forces during melt-kneading, thereby controlling the generation of heat, and from the viewpoint of reducing the temperature during melt-kneading, thereby improving durability and low-temperature fusing ability of the toner.

The temperature of the roller can be adjusted by, for example, a temperature of a heating medium passing through the inner portion of the roller, and each roller may be divided in two or more portions in the inner portion of the roller, each being passed through with heating media of different temperatures.

The temperature at the end part of the raw material-supplying side of the high-rotation roller is preferably 100° C. or higher and 160° C. or lower, from the viewpoint of reducing mechanical forces during melt-kneading, thereby controlling the generation of heat, and from the viewpoint of improving durability and low-temperature fusing ability of the toner, and the temperature at the end part of the raw material-supplying side of the low-rotation roller is preferably 30° C. or higher and 100° C. or lower, from the same viewpoint.

In the high-rotation roller, the difference between setting temperatures of the end part of the raw material-supplying side and the end part of the kneaded product-discharging side is preferably 20° C. or more, and more preferably 30° C. or more, and preferably 60° C. or less, and more preferably 50° C. or less, from the viewpoint of preventing detachment of the kneaded product from the roller, from the viewpoint of reducing mechanical forces during melt-kneading, thereby controlling the generation of heat, and from the viewpoint of improving durability and low-temperature fusing ability of the toner.

In the low-rotation roller, the difference between setting temperatures of the end part of the raw material-supplying side and the end part of the kneaded product-discharging side is preferably 0° C. or more, more preferably 10° C. or more, and even more preferably 20° C. or more, and preferably 50° C. or less, from the viewpoint of improving dispersibility of additives such as an ester wax, a colorant, and a charge control agent in the toner, from the viewpoint of reducing mechanical forces during the melt-kneading, thereby controlling heat generation, and from the viewpoint of improving durability and low-temperature fusing ability of the toner.

The peripheral speed of the high-rotation roller is preferably 2 m/min or more, more preferably 10 m/min or more, and even more preferably 25 m/min or more, and preferably 100 m/min or less, more preferably 75 m/min or less, and even more preferably 50 m/min or less, from the viewpoint of improving dispersibility of additives such as an ester wax, a colorant, and a charge control agent in the toner, from the viewpoint of reducing mechanical forces during the melt-kneading, thereby controlling heat generation, and from the viewpoint of improving durability and low-temperature fusing ability of the toner.

The peripheral speed of the low-rotation roller is preferably 1 m/min or more, more preferably 5 m/min or more, and even more preferably 15 m/min or more, and preferably 90 m/min or less, more preferably 60 m/min or less, and even more preferably 30 in/min or less, from the same viewpoint. In addition, the ratio of the peripheral speeds of the two rollers (low-rotation roller/high-rotation roller) is preferably from 1/10 to 9/10, and more preferably from 3/10 to 8/10.

Structures, size, materials and the like of the roller are not particularly limited. Also, the surface of the roller may be any of smooth, wavy, rugged, or other surfaces. From the viewpoint of increasing kneading share and improving dispersibility of additives such as an ester wax, a colorant, and a charge control agent in the toner, from the viewpoint of reducing mechanical forces during the melt-kneading, thereby controlling heat generation, and from the viewpoint of improving durability and low-temperature fusing ability of the toner, it is preferable that plural spiral ditches are engraved on the surface of each roller.

The kneaded product obtained in the step 1 is appropriately cooled to a pulverizable hardness, and pulverized in the step 2. Here, since the present invention does not particularly require a heat treatment in order to accelerate recrystallization of the crystalline resin, it is preferable that heating is not carried out after the melt-kneading step. However, after the kneading step, the kneaded product obtained may be subjected to a pulverizing step after being subjected to a heat-treating step, within the range that would not influence the productivity of the toner.

The temperature of the heat-treating step when the heat-treating step is carried out is preferably a temperature equal to or higher than a glass transition temperature of a kneaded product, more preferably a temperature equal to or higher than the glass transition temperature by 10° C. or more, and even more preferably a temperature equal to or higher than the glass transition temperature by 15° C. or more, from the viewpoint of improving dispersibility of toner components such as an ester wax, a colorant, and a charge control agent in the resin binder, and from the viewpoint of accelerating the crystallization of the crystalline resin, thereby improving low-temperature fusing ability and heat-resistant storage property of the toner. In addition, it is desired that the temperature of the heat-treating step is a temperature equal to or lower than a melting point of the crystalline resin, more preferably a temperature lower than the melting point by 10° C. or more, and even more preferably a temperature lower than the melting point by 15° C. or more, from the viewpoint of preventing the lowering of heat-resistant storage property of the toner due to randomness of arrangements accompanying dissolution of crystals. Specifically, it is desired that the heat-treating step is carried out at a temperature of 50° C. or higher and 80° C. or lower, and more preferably at a temperature of 60° C. or higher and 80° C. or lower.

In addition, the heat treatment time is preferably 1 hour or longer, more preferably 3 hours or longer, and even more preferably 6 hours or longer, from the viewpoint of accelerating crystallization of the crystalline resin, thereby improving low-temperature fusing ability and heat-resistant storage property of the toner. In addition, the heat treatment time is preferably 12 hours or shorter, and more preferably 10 hours or shorter, from the viewpoint of not influencing the productivity of the toner. Here, this time is a cumulative time within the above temperature range (a temperature equal to or higher than a glass transition temperature of a kneaded product and a temperature equal to or lower than a melting point of a crystalline resin). In addition, it is preferable that the temperature does not exceed the upper limit of the temperature range from the beginning to the end of the heat-treating step, from the viewpoint of maintaining dispersibility of additives in the toner.

In the heat-treating step, an oven or the like can be used. For example, when an oven is used, the heat-treating step can be carried out by holding a kneaded product to a constant temperature in an oven.

Embodiments for carrying out the heat-treating step include, but not particularly limited to, for example:

Embodiment 1: An embodiment including pulverizing a kneaded product in a pulverizing step after a kneading step, and holding a pulverized kneaded product under the above heat treatment conditions;

Embodiment 2: An embodiment including, in a process of cooling a kneaded product obtained after a kneading step to lower the temperature, holding a kneaded product under the above heat treatment conditions, thereafter further cooling a heat-treated kneaded product until a pulverizable hardness is attained to subject a cooled kneaded product to a subsequent step such as a pulverizing step;

Embodiment 3: An embodiment including once cooling a kneaded product obtained after a kneading step to a pulverizable hardness, thereafter subjecting a cooled kneaded product to the above heat-treating step, and thereafter cooling the kneaded product again to subject a cooled kneaded product to a subsequent step such as a pulverizing step;

and the like.

In the present invention, the heat-treating step may be carried out by any one of the embodiments, and Embodiment 3 is preferred, from the viewpoint of maintaining dispersibility of additives in the toner.

The pulverization of a kneaded product may be carried out in divided multi-stages. For example, a kneaded product may be roughly pulverized to a size of from 1 to 5 mm or so, and the roughly pulverized product may then be further finely pulverized to a desired particle size.

The pulverizer usable in the pulverizing step is not particularly limited. For example, the pulverizer suitably used in the rough pulverization includes a hammer-mill, an atomizer, Rotoplex, and the like. The pulverizer suitably used in the fine pulverization includes a fluidised bed opposed jet mill, an impact jet mill, a rotary mechanical mill, and the like.

It is preferable that a pulverized product is further classified to adjust to a desired particle size.

The classifier usable in the classification includes an air classifier, a rotor-type classifier, a sieve classifier, and the like. The pulverized product which is insufficiently pulverized and removed during the classification may be subjected to the pulverizing step again, and the pulverization and the classification may be repeated as occasion demands.

In the toner of the present invention, it is preferable to use an external additive in order to improve transferability. The external additive includes fine inorganic particles of silica, alumina, titania, zirconia, tin oxide, zinc oxide, and the like, and fine organic particles of resin particles such as fine melamine resin particles and fine polytetrafluoroethylene resin particles. Two or more kinds of the external additives may be used in combination. Among them, silica is preferred, and a hydrophobic silica that is hydrophobically treated is more preferred, from the viewpoint of transferability of the toner.

The hydrophobic treatment agent for hydrophobically treating the surface of silica particles includes hexamethyldisilazane (HMDS), dimethyldichlorosilane (DMDS), a silicone oil, octyltriethoxysilane (OTES), methyltriethoxysilane, and the like.

The average particle size of the external additive is preferably 10 nm or more, and more preferably 15 nm or more, from the viewpoint of chargeability, fluidity, and transferability of the toner. In addition, the average particle size is preferably 250 nm or less, more preferably 200 nm or less, and even more preferably 90 nm or less, from the same viewpoint.

The content of the external additive, based on 100 parts by mass of the toner before the treatment with the external additive, is preferably 0.05 parts by mass or more, more preferably 0.1 parts by mass or more, and even more preferably 0.3 parts by mass or more, from the viewpoint of chargeability, fluidity, and transferability of the toner. In addition, the content is preferably 5 parts by mass or less, and more preferably 3 parts by mass or less, from the same viewpoint.

The volume-median particle size ($D_{50}$) of the toner of the present invention is preferably 3 μm or more, and more preferably 4 μm or more, and preferably 15 μm or less, and more preferably 10 μm or less. The volume-median particle size ($D_{50}$) as used herein means a particle size of which cumulative volume frequency calculated on a volume percentage is 50% counted from the smaller particle sizes. Also, in a case where the toner is treated with an external additive, the volume-median particle size of the toner particles before the treatment with an external additive is defined as a volume-median particle size of the toner.

The toner of the present invention can be used as a toner for monocomponent development, or a toner may be mixed with a carrier to provide a two-component developer.

With regard to the embodiments described above, the present invention further disclose the following toner for electrophotography and the method for producing the same.

<1> A toner for electrophotography containing a resin binder containing a crystalline composite resin C and an amorphous polyester A and
an ester wax,
wherein the crystalline composite resin C is a resin containing a polycondensation resin component and a styrenic resin component, wherein the polycondensation resin component is obtained by polycondensing an alcohol component containing an aliphatic diol having 9 or more carbon atoms and 14 or less carbon atoms, and a carboxylic acid component containing an aliphatic dicarboxylic acid compound having 9 or more carbon atoms and 14 or less carbon atoms,
wherein a mass ratio of the amorphous polyester A to the crystalline composite resin C (amorphous polyester A/crystalline composite resin C) is 60/40 or more and 95/5 or less, and
wherein a mass ratio of the crystalline composite resin C to the ester wax (crystalline composite resin C/ester wax) is 0.5 or more and 9 or less.

<2> The toner for electrophotography according to the above <1>, wherein the polycondensation resin component is a polyester.

<3> The toner for electrophotography according to the above <1> or <2>, wherein the number of carbon atoms of the aliphatic diol contained in the alcohol component for the polycondensation resin component is 10 or more, and preferably 12 or less, and more preferably 10.

<4> The toner for electrophotography according to any one of the above <1> to <3>, wherein the aliphatic diol having 9 or more carbon atoms and 14 or less carbon atoms includes linear α,ω-alkanediols, including preferably one or two members selected from 1,10-decanediol and 1,12-dodecanediol, and including more preferably 1,10-decanediol.

<5> The toner for electrophotography according to any one of the above <1> to <4>, wherein the content of the aliphatic diol having 9 or more carbon atoms and 14 or less carbon atoms is 70% by mol or more, preferably 90% by mol or more, and more preferably 95% by mol or more, and 100% by mol or less, preferably substantially 100% by mol, and more preferably 100% by mol, of the alcohol component for the polycondensation resin component.

<6> The toner for electrophotography according to any one of the above <1> to <5>, wherein the number of carbon atoms of the aliphatic dicarboxylic acid compound contained in the carboxylic acid component for the polycondensation resin is 10 or more, and preferably 12 or less, and more preferably 10.

<7> The toner for electrophotography according to any one of the above <1> to <6>, wherein the aliphatic dicarboxylic acid compound having 9 or more carbon atoms and 14 or less carbon atoms includes linear α,ω-alkanedicarboxylic acid compounds, including preferably one or two members selected from sebacic acid and dodecanedioic acid, and including more preferably sebacic acid.

<8> The toner for electrophotography according to any one of the above <1> to <7>, wherein the content of the aliphatic dicarboxylic acid compound having 9 or more carbon atoms and 14 or less carbon atoms is 70% by mol or more, preferably 90% by mol or more, and more preferably 95% by mol or more, and preferably 100% by mol or less, more preferably substantially 100% by mol, and even more preferably 100% by mol, of the carboxylic acid component for the polycondensation resin.

<9> The toner for electrophotography according to any one of the above <1> to <8>, wherein a total number of moles of the aliphatic dicarboxylic acid compound having 9 or more carbon atoms and 14 or less carbon atoms and the aliphatic diol having 9 or more carbon atoms and 14 or less carbon atoms is 80% by mol or more, preferably 90% by mol or more, more preferably 93% by mol or more, even more preferably 95% by mol or more, and even more preferably 97% by mol or more, and 100% by mol or less, preferably substantially 100% by mol, and more preferably 100% by mol, of a total number of moles of the carboxylic acid component and the alcohol component which are raw material monomers for the polycondensation resin component.

<10> The toner for electrophotography according to any one of the above <1> to <9>, wherein a total number of moles of the aliphatic dicarboxylic acid compound having 9 or more carbon atoms and 14 or less carbon atoms and the aliphatic diol having 9 or more carbon atoms and 14 or less carbon atoms is 80% by mol or more, preferably 90% by mol or more, and more preferably 95% by mol or more, and 100% by mol or less, preferably substantially 100% by mol, and more preferably 100% by mol, of a total number of moles of the dicarboxylic or higher polycarboxylic acid compound in the carboxylic acid component and the dihydric or higher polyhydric alcohols in the alcohol component which are raw material monomers for the polycondensation resin component.

<11> The toner for electrophotography according to any one of the above <1> to <10>, wherein the glass transition temperature of the styrenic resin component is 60° C. or higher, preferably 80° C. or higher, and more preferably 90° C. or higher, and 130° C. or lower, preferably 120° C. or lower, and more preferably 110° C. or lower.

<12> The toner for electrophotography according to any one of the above <1> to <11>, wherein the absolute value of a difference in a glass transition temperature of the crystalline composite resin C and a glass transition temperature of the styrenic resin component in the crystalline composite resin C calculated according to Fox's formula is 10° C. or more, preferably 30° C. or more, and more preferably 50° C. or more, and 120° C. or less.

<13> The toner for electrophotography according to any one of the above <1> to <12>, wherein the crystalline composite resin C is a resin obtained by polymerizing (i) raw material monomers for a polycondensation resin component, containing an alcohol component containing an aliphatic diol having 9 or more carbon atoms and 14 or less carbon atoms and a carboxylic acid component containing an aliphatic dicarboxylic acid compound having 9 or more carbon atoms and 14 or less carbon atoms; (ii) raw material monomers for a styrenic resin component; and (iii) a dually reactive monomer capable of reacting with both of the raw material monomers for the polycondensation resin component and the raw material monomers for the styrenic resin component.

<14> The toner for electrophotography according to the above <13>, wherein the dually reactive monomer is a compound having in its molecule at least one functional group selected from the group consisting of a hydroxyl group, a carboxy group, an epoxy group, a primary amino group and a secondary amino group, preferably a hydroxyl group and/or a carboxy group, and more preferably a carboxy group, and an ethylenically unsaturated bond, and the dually reactive monomer is preferably at least one member selected from the group consisting of acrylic acid, methacrylic acid, fumaric acid, maleic acid, and maleic anhydride, and more preferably acrylic acid, methacrylic acid or fumaric acid.

<15> The toner for electrophotography according to the above <13> or <14>, wherein the amount of the dually reactive monomer used, based on 100 mol in a total of the alcohol component for the polycondensation resin component, is 1 mol or more, and preferably 2 mol or more, and 30 mol or less, preferably 20 mol or less, more preferably 15 mol or less, even more preferably 10 mol or less, and even more preferably 5 mol or less.

<16> The toner for electrophotography according to any one of the above <13> to <15>, wherein the amount of the dually reactive monomer used, based on 100 parts by mass in a total of the raw material monomers for the styrenic resin component, is 1 part by mass or more, and preferably 2 parts by mass or more, and 30 parts by mass or less, preferably 20 parts by mass or less, more preferably 15 parts by mass or less, and even more preferably 10 parts by mass or less.

<17> The toner for electrophotography according to any one of the above <1> to <16>, wherein a mass ratio of the polycondensation resin component to the styrenic resin component in the crystalline composite resin C (polycondensation resin component/styrenic resin component) is 55/45 or more, preferably 70/30 or more, more preferably 80/20 or more, and even more preferably 85/15 or more, and 95/5 or less, and preferably 92/8 or less.

<18> The toner for electrophotography according to any one of the above <1> to <17>, wherein the content of the crystalline composite resin C in the resin binder is 3% by mass or more, preferably 5% by mass or more, more preferably 7% by mass or more, and even more preferably 8% by mass or more, and 40% by mass or less, preferably 30% by mass or less, more preferably 20% by mass or less, and even more preferably 15% by mass or less.

<19> The toner for electrophotography according to any one of the above <1> to <18>, wherein the amorphous polyester A is obtained by polycondensing an alcohol component containing a dihydric or higher polyhydric alcohol and a carboxylic acid component containing a dicarboxylic or higher polycarboxylic acid compound.

<20> The toner for electrophotography according to the above <19>, wherein the alcohol component for the amorphous polyester A contains an alkylene oxide adduct of bisphenol A represented by the formula (I), wherein the content of the alkylene oxide adduct of bisphenol A represented by the formula (I) is preferably 50% by mol or more, more preferably 70% by mol or more, and even more preferably 90% by mol or more, and preferably 100% by mol or less, more preferably substantially 100% by mol, and even more preferably 100% by mol, of the alcohol component.

<21> The toner for electrophotography according to the above <19> or <20>, wherein the carboxylic acid component for the amorphous polyester A contains at least one member selected from the group consisting of terephthalic acid, succinic acid substituted with an alkyl group or alkenyl group having 2 or more carbon atoms and 20 or less carbon atoms, and trimellitic anhydride, and contains preferably terephthalic acid.

<22> The toner for electrophotography according to the above <21>, wherein a total content of terephthalic acid, succinic acid substituted with an alkyl group or alkenyl group having 2 or more carbon atoms and 20 or less carbon atoms, and trimellitic anhydride is 60% by mol or more, preferably 80% by mol or more, and more preferably 90% by mol or more, and preferably 100% by mol or less, of the carboxylic acid component.

<23> The toner for electrophotography according to any one of the above <1> to <22>, wherein the softening point of the amorphous polyester A is 90° C. or higher, preferably 100° C. or higher, and more preferably 105° C. or higher, and 150° C. or lower, preferably 140° C. or lower, and more preferably 130° C. or lower.

<24> The toner for electrophotography according to any one of the above <1> to <22>, wherein the amorphous polyester A contains two kinds of amorphous polyesters having different softening points, wherein the difference in softening points is preferably 5° C. or more, and more preferably 10° C. or more, and preferably 40° C. or less, and more preferably 30° C. or less.

<25> The toner for electrophotography according to the above <24>, wherein the softening point of the amorphous polyester AL having a lower softening point is 80° C. or higher, preferably 95° C. or higher, and more preferably 105° C. or higher, and 135° C. or lower, preferably 120° C. or lower, and more preferably lower than 115° C., and wherein the softening point of the amorphous polyester AH having a higher softening point is 110° C. or higher, preferably 115° C. or higher, and more preferably 118° C. or higher, and 170° C. or lower, preferably 160° C. or lower, and more preferably 150° C. or lower.

<26> The toner for electrophotography according to the above <24> or <25>, wherein the amorphous polyester AL having a lower softening point is a resin obtained by polycondensing an alcohol component containing an ethylene oxide adduct of bisphenol A represented by the formula (II) and a carboxylic acid component.

<27> The toner for electrophotography according to the above <26>, wherein the content of the ethylene oxide adduct of bisphenol A represented by the formula (II) is 55% by mol or more, preferably 60% by mol or more, and more preferably 62% by mol or more, and 90% by mol or less, preferably 80% by mol or less, and more preferably 70% by mol or less, of the alcohol component for the amorphous polyester AL.

<28> The toner for electrophotography according to any one of the above <24> to <27>, wherein the content of the ethylene oxide adduct of bisphenol A represented by the formula (II) is less than 55% by mol, and preferably 53% by mol or less, and 20% by mol or more, preferably 30% by mol or more, and more preferably 40% by mol or more, of the alcohol component for the amorphous polyester AH having a higher softening point.

<29> The toner for electrophotography according to any one of the above <24> to <28>, wherein a mass ratio of the amorphous polyester AH having a higher softening point to the amorphous polyester AL having a lower softening point (amorphous polyester AH/amorphous polyester AL) is 1/9 or more, preferably 2/8 or more, and more preferably 3/7 or more, and 9/1 or less, preferably 8/2 or less, more preferably 5/5 or less, and even more preferably 4/6 or less.

<30> The toner for electrophotography according to any one of the above <1> to <29>, wherein a mass ratio of the amorphous polyester A to the crystalline composite resin C (amorphous polyester A/crystalline composite resin C) is 92/8 or less, and 70/30 or more, preferably 80/20 or more, more preferably 85/15 or more, and even more preferably 88/12 or more.

<31> The toner for electrophotography according to any one of the above <1> to <30>, wherein a difference in SP values between the crystalline composite resin C and the amorphous polyester A is 1.0 or more, and preferably 1.2 or more, and more preferably 2.0 or less.

<32> The toner for electrophotography according to any one of the above <1> to <31>, wherein the ester wax contains a natural ester wax, wherein the natural ester wax is preferably carnauba wax.

<33> The toner for electrophotography according to any one of the above <1> to <31>, wherein the ester wax contains a synthetic ester wax, wherein the synthetic ester wax is preferably an ester in which a monohydric aliphatic alcohol having 14 or more carbon atoms and 24 or less carbon atoms is reacted with a fatty acid having 14 or more carbon atoms and 24 or less carbon atoms and an ester in which pentaerythritol is reacted with a fatty acid having 14 or more carbon atoms and 24 or less carbon atoms, and more preferably an ester in which a monohydric aliphatic alcohol having 18 or more carbon atoms and 24 or less carbon atoms is reacted with a fatty acid having 18 or more carbon atoms and 24 or less carbon atoms and an ester in which pentaerythritol is reacted with a fatty acid having 18 or more carbon atoms and 24 or less carbon atoms.

<34> The toner for electrophotography according to any one of the above <1> to <31>, wherein the ester wax is at least one member selected from the group consisting of carnauba wax, montan wax, rice wax, an ester in which a monohydric aliphatic alcohol having 14 or more carbon atoms and 24 or less carbon atoms is reacted with a fatty acid having 14 or more carbon atoms and 24 or less carbon atoms, and an ester in which pentaerythritol is reacted with a fatty acid having 14 or more carbon atoms and 24 or less carbon atoms, preferably at least one member selected from the group consisting of carnauba wax, an ester in which a monohydric aliphatic alcohol having 18 or more carbon atoms and 24 or less carbon atoms is reacted with a fatty acid having 18 or more carbon atoms and 24 or less carbon atoms, and an ester in which pentaerythritol is reacted with a fatty acid having 18 or more carbon atoms and 24 or less carbon atoms, and more preferably carnauba wax.

<35> The toner for electrophotography according to any one of the above <1> to <34>, wherein the melting point of the ester wax is 60° C. or higher, preferably 70° C. or higher, and more preferably 75° C. or higher, and 100° C. or lower, preferably 90° C. or lower, and more preferably 85° C. or lower.

<36> The toner for electrophotography according to any one of the above <1> to <35>, wherein the content of the ester wax is 0.6 parts by mass or more, preferably 1 part by mass or more, more preferably 2 parts by mass or more, even more preferably 2.5 parts by mass or more, even more preferably 4 parts by mass or more, even more preferably 6 parts by mass or more, and even more preferably 8 parts by mass or more, based on 100 parts by mass of a total of the crystalline composite resin C and the amorphous polyester A.

<37> The toner for electrophotography according to any one of the above <1> to <36>, wherein the content of the ester wax is 10 parts by mass or less, preferably 8 parts by mass or less, more preferably 6 parts by mass or less, even more preferably 5 parts by mass or less, even more preferably 4 parts by mass, and even more preferably 2 parts by mass or less, based on 100 parts by mass of a total of the crystalline composite resin C and the amorphous polyester A.

<38> The toner for electrophotography according to any one of the above <1> to <37>, wherein the content of the ester wax is 0.6 parts by mass or more, preferably 1 part by mass or more, more preferably 2 parts by mass or more, even more preferably 2.5 parts by mass or more, even more preferably 4 parts by mass or more, even more preferably 6 parts by mass or more, and even more preferably 8 parts by mass or more, based on 100 parts by mass of the resin binder.

<39> The toner for electrophotography according to any one of the above <1> to <38>, wherein the content of the ester wax is 10 parts by mass or less, preferably 8 parts by mass or less, more preferably 6 parts by mass or less, even more preferably 5 parts by mass or less, even more preferably 4 parts by mass or less, and even more preferably 2 parts by mass or less, based on 100 parts by mass of the resin binder.

<40> The toner for electrophotography according to any one of the above <1> to <39>, wherein a mass ratio of the crystalline composite resin C to the ester wax (the crystalline composite resin C/the ester wax) is 0.7 or more, preferably 1 or more, more preferably 2 or more, and even more preferably 2.5 or more, and 8 or less, preferably 7 or less, more preferably 6 or less, and even more preferably 4 or less.

<41> A method for producing a toner for electrophotography as defined in any one of the above <1> to <40>, including:

step 1: melt-kneading toner components containing a crystalline composite resin C, an amorphous polyester A, and an ester wax with an open roller-type kneader; and step 2: pulverizing a kneaded product obtained.

The following examples further describe and demonstrate embodiments of the present invention. The examples are given solely for the purposes of illustration and are not to be construed as limitations of the present invention. The physical properties of the resins and the like were measured by the following methods.

[Softening Point of Resin]

The softening point refers to a temperature at which half of the sample flows out, when plotting a downward movement of a plunger of a flow tester "CFT-500D" (manufactured by Shimadzu Corporation), against temperature, in which a 1 g sample is extruded through a nozzle having a die pore size of 1 mm and a length of 1 mm with applying a load of 1.96 MPa thereto with the plunger, while heating the sample so as to raise the temperature at a rate of 6° C./min.

[Highest Temperature of Endothermic Peak of Resin]

Measurements are taken using a differential scanning calorimeter "Q-100" (manufactured by TA Instruments, Japan), by weighing out a 0.01 to 0.02 g sample in an aluminum pan, cooling the sample from room temperature to 0° C. at a cooling rate of 10° C./min, and keeping at 0° C. for one minute. Thereafter, the measurements are taken while heating at a rate of 10° C./min. Of the endothermic peaks observed, a temperature of the peak of the highest temperature side is defined as a highest temperature of endothermic peak.

[Glass Transition Temperature of Crystalline Resin]

Measurements are taken using a differential scanning calorimeter "Q-100" (manufactured by TA Instruments, Japan), by weighing out a 0.01 to 0.02 g sample in an aluminum pan, heating the sample to 200° C., and cooling the sample from that temperature to −80° C. at a cooling rate of 100° C./min. Next, the glass transition temperature is measured by heating the sample at a heating rate of 1° C./min in a modulated mode (temperature-modulated mode). A temperature of an intersection of the extension of the baseline of equal to or lower than the highest temperature of endothermic peak and the tangential line showing the maximum inclination between the kick-off of the peak and the top of the peak in the above measurement is defined as a glass transition temperature.

[Glass Transition Temperature of Amorphous Resin]

Measurements are taken using a differential scanning calorimeter "Q-100" (manufactured by TA Instruments, Japan), by weighing out a 0.01 to 0.02 g sample in an aluminum pan, heating the sample to 200° C., and cooling the sample from that temperature to 0° C. at a cooling rate of 10° C./min. Next, the measurements are taken while heating at a rate of 10° C./min. A temperature of an intersection of the extension of the baseline of equal to or lower than the highest temperature of endothermic peak and the tangential line showing the maximum inclination between the kick-off of the peak and the top of the peak in the above measurement is defined as a glass transition temperature.

[Acid Value of Resin]

The acid value is determined by a method according to JIS K0070 except that only the determination solvent is changed from a mixed solvent of ethanol and ether as defined in JIS K0070 to a mixed solvent of acetone and toluene in a volume ratio of acetone:toluene=1:1.

[Melting Point of Releasing Agent]

Measurements are taken using a differential scanning calorimeter "DSC Q20" (manufactured by TA Instruments, Japan), by weighing out a 0.01 to 0.02 g sample in an aluminum pan, heating the sample to 200° C. at a heating rate of 10° C./min, and cooling the sample from that temperature to −10° C. at a cooling rate of 5° C./min. Next, the measurements are taken while heating the sample to 180° C. at a rate of 10° C./min. A highest temperature of endothermic peak observed in the melting endothermic curve obtained is defined as a melting point of a releasing agent.

[Average Particle Size of External Additive]

The average particle size refers to a number-average particle size, which is defined as a number-average of particle sizes for 500 particles determined from a photograph taken with a scanning electron microscope (SEM). In a case where the particles have length and breadth, the average particle size refers to the length of the particles.

[Volume-Median Particle Size of Toner]

Measuring Apparatus: Coulter Multisizer II (manufactured by Beckman Coulter, Inc.)

Aperture Diameter: 50

Analyzing Software: Coulter Multisizer AccuComp Ver. 1.19 (manufactured by Beckman Coulter, Inc.)

Electrolytic Solution: Isotone II (manufactured by Beckman Coulter, Inc.)

Dispersion: EMULGEN 109P (manufactured by Kao Corporation), polyoxyethylene lauryl ether, HLB (Griffin):

13.6, is dissolved in the above electrolytic solution and adjusted so as to have a concentration of 5% by mass to provide a dispersion.

Dispersion Conditions: Ten milligrams of a measurement sample is added to 5 ml of the above dispersion, and the mixture is dispersed for 1 minute with an ultrasonic disperser (name of machine: US-1, manufactured by SND Co., Ltd., output: 80 W). Thereafter, 25 ml of the above electrolytic solution is added to the dispersion, and further dispersed with the ultrasonic disperser for 1 minute, to prepare a sample dispersion.

Measurement Conditions: The above sample dispersion is added to 100 ml of the above electrolytic solution so as to have a concentration at which particle sizes of 30,000 particles can be measured in 20 seconds, and thereafter the 30,000 particles are measured, and a volume-median particle size ($D_{50}$) is obtained from the particle size distribution.

Production Example 1 of Resins [Resins a to h]

A 10-liter four-neck flask equipped with a nitrogen inlet tube, a dehydration tube, a stirrer, and a thermocouple was charged with given amounts of raw material monomers for a polycondensation resin component other than a dually reactive monomer acrylic acid, as listed in Table 1 or 2, and the contents were heated to 160° C. to dissolve. Raw material monomers for a styrenic resin component, a polymerization initiator, and acrylic acid as listed in Table 1 or 2 were added dropwise thereto from a dropping funnel over 1 hour. The contents were continued stirring for one hour, while keeping the temperature at 160° C. to allow polymerization of the raw material monomers for the styrenic resin component and acrylic acid, the polymerized mixture was then stirred at 8.3 kPa for one hour, and unreacted monomers for the styrenic resin component were removed. Thereafter, 40 g of tin(II) 2-ethylhexanoate and 3 g of gallic acid were added thereto, and the contents were heated to 210° C., and reacted for 8 hours. The reaction mixture was further reacted at 8 kPa for one hour, to provide a crystalline hybrid resin. The physical properties of the resulting resin are shown in Table 1 or 2.

Production Example 2 of Resin [Resin i]

A 10-liter four-neck flask equipped with a nitrogen inlet tube, a dehydration tube, a stirrer, and a thermocouple was charged with raw material monomers for a polycondensation resin component as listed in Table 2, 40 g of tin(II) 2-ethylhexanoate, and 2 g of gallic acid, and the contents were heated to 210° C. under nitrogen atmosphere, and reacted for 10 hours. The reaction mixture was further reacted at 8 kPa for one hour, to provide a crystalline polyester. The physical properties of the resulting resin are shown in Table 2.

TABLE 1

| | Resin a | Resin b | Resin c | Resin d | Resin e |
|---|---|---|---|---|---|
| [Crystalline Composite Resin] | | | | | |
| Raw Material Monomers | | | | | |
| Raw Material Monomers[1] for Polycondensation Resin Component | | | | | |
| 1,10-Decanediol | 4,183 g (100) | 3,828 g (100) | 3,519 g (100) | 3,180 g (100) | — |
| 1,12-Dodecanediol | — | — | — | — | 4,006 g (100) |
| Sebacic Acid | 4,710 g (97) | 3,999 g (90) | 3,267 g (80) | 2,584 g (70) | 3,605 g (90) |
| Acrylic Acid (Dually Reactive Monomer) | 52 g (3) | 111 g (7) | 160 g (11) | 184 g (14) | 100 g (7) |
| Raw Material Monomers[2] for Styrenic Resin Component | | | | | |
| Styrene | 899 g (100) | 1,800 g (100) | 2,706 g (100) | 3,628 g (100) | 1,761 g (100) |
| Dibutyl Peroxide (Polymerization Initiator) | 54 g (6) | 108 g (6) | 162 g (6) | 218 g (6) | 106 g (6) |
| Polycondensation Resin Component/ Styrenic Resin Component (P/S, Mass Ratio)[3] | 90/10 | 80/20 | 70/30 | 60/40 | 80/20 |
| Parts by Mass of Dually Reactive Monomer, Based on 100 Parts by Mass of Raw Material Monomers for Styrenic Resin Component | 5 | 6 | 6 | 5 | 5 |
| Physical Properties of Resin | | | | | |
| Softening Point (° C.) | 89 | 87 | 79 | 74 | 91 |
| Highest Temperature of Endothermic Peak [Melting Point] (° C.) | 75 | 72 | 61 | 63 | 83 |
| Crystallinity Index | 1.2 | 1.2 | 1.3 | 1.2 | 1.1 |
| Glass Transition Temperature of Styrenic Resin Component According to Fox's Formula (° C.) (Tg1) | 100 | 100 | 100 | 100 | 100 |

TABLE 1-continued

[Crystalline Composite Resin]

|  | Resin a | Resin b | Resin c | Resin d | Resin e |
|---|---|---|---|---|---|
| Glass Transition Temperature of Crystalline Composite Resin (° C.) (Tg2) | 42 | 13 | 12 | 0 | 16 |
| Tg1 – Tg2 | 58 | 87 | 88 | 100 | 84 |
| SP Value | 9.8 | 9.8 | 9.9 | 9.9 | 9.6 |

[1] Numerical values inside parenthesis express the number of moles when a total number of moles of the alcohol component is 100.
[2] Numerical values inside parenthesis express the mass ratio when a total amount of raw material monomers for the styrenic resin component is 100.
[3] The amount of the polycondensation resin component is an amount subtracting the mass of reaction water (calculation value) from a total of the mass of the raw material monomers for the polycondensation resin component including acrylic acid (dually reactive monomer). The amount of the styrenic resin component is a total of the mass of the raw material monomers for the styrenic resin component. The total amount of the raw material monomers for the styrenic resin component does not include dibutyl peroxide.

TABLE 2

[Crystalline Composite Resin or Crystalline Polyester]

|  | Resin f | Resin g | Resin h | Resin i |
|---|---|---|---|---|
| Raw Material Monomers |  |  |  |  |
| Raw Material Monomers[1] for Polycondensation Resin Component |  |  |  |  |
| 1,10-Decanediol | — | 3,828 g (100) | — | 3,828 g (100) |
| 1,9-Nonanediol | 3,527 g (100) | — | — | — |
| 1,6-Hexanediol | — | — | 2,478 g (70) | — |
| 1,4-Butanediol | — | — | 810 g (30) | — |
| Sebacic Acid | 4,006 g (90) | — | — | 4,443 g (100) |
| Azelaic Acid | — | 3,720 g (90) | — | — |
| Terephthalic Acid | — | — | 3,984 g (80) | — |
| Acrylic Acid (Dually Reactive Monomer) | 111 g (7) | 111 g (7) | 151 g (7) | — |
| Raw Material Monomers[2] for Styrenic Resin Component |  |  |  |  |
| Styrene | 1,726 g (100) | 1,700 g (100) | 1,630 g (100) | — |
| Dibutyl Peroxide (Polymerization Initiator) | 104 g (6) | 102 g (6) | 98 g (6) | — |
| Polycondensation Resin Component/Styrenic Resin Component (P/S, Mass Ratio)[3] | 80/20 | 80/20 | 80/20 | 100/0 |
| Parts by Mass of Dually Reactive Monomer, Based on 100 Parts by Mass of Raw Material Monomers for Styrenic Resin Component | 6 | 6 | 9 | — |
| Physical Properties of Resin |  |  |  |  |
| Softening Point (° C.) | 86 | 86 | 108 | 89 |
| Highest Temperature of Endothermic Peak [Melting Point] (° C.) | 70 | 72 | 109 | 78 |
| Crystallinity Index | 1.2 | 1.2 | 1.0 | 1.2 |
| Glass Transition Temperature of Styrenic Resin Component According to Fox's Formula (° C.) [Tg1] | 100 | 100 | 100 | — |
| Glass Transition Temperature of Crystalline Resin (° C.) [Tg2] | 15 | 20 | 7 | — |
| Tg1 – Tg2 | 85 | 80 | 93 | — |
| SP Value | 10.0 | 10.1 | 11.3 | 9.7 |

[1] Numerical values inside parenthesis express the number of moles when a total number of moles of the alcohol component is 100.
[2] Numerical values inside parenthesis express the mass ratio when a total amount of raw material monomers for the styrenic resin component is 100.
[3] The amount of the polycondensation resin component is an amount subtracting the mass of reaction water (calculation value) from a total of the mass of the raw material monomers for the polycondensation resin component including acrylic acid (dually reactive monomer). The amount of the styrenic resin component is a total of the mass of the raw material monomers for the styrenic resin component. The total amount of the raw material monomers for the styrenic resin component does not include dibutyl peroxide.

Production Example 3 of Resin [Resin A]

A 10-liter four-neck flask equipped with a nitrogen inlet tube, a dehydration tube, a stirrer, and a thermocouple was charged with raw material monomers as listed in Table 3, 40 g of tin 2-ethylhexanoate, and 2 g of gallic acid, and the contents were heated to 235° C. under nitrogen atmosphere, and reacted for 8 hours. The reaction mixture was further reacted at 8 kPa until the softening point reached 110° C., to provide an amorphous polyester. The physical properties of the resulting resin are shown in Table 3.

Production Example 4 of Resin [Resin B]

A 10-liter four-neck flask equipped with a nitrogen inlet tube, a dehydration tube, a stirrer, and a thermocouple was charged with raw material monomers other than trimellitic anhydride as listed in Table 3, 40 g of tin 2-ethylhexanoate, and 2 g of gallic acid, and the contents were heated to 235° C. under nitrogen atmosphere, and reacted for 8 hours. Next, the temperature was lowered to 210° C., the pressure was recovered to an ambient pressure (101.3 kPa), trimellitic anhydride was added thereto, and the mixture was reacted under conditions of 210° C. and an ambient pressure for one hour. The reaction mixture was further reacted at 8 kPa until the softening point reached 121° C., to provide an amorphous polyester. The physical properties of the resulting resin are shown in Table 3.

Production Example 5 of Resin [Resin C]

A 10-liter four-neck flask equipped with a nitrogen inlet tube, a dehydration tube, a stirrer, and a thermocouple was charged with raw material monomers for a polyester other than fumaric acid and trimellitic anhydride as listed in Table 3, 40 g of tin(II) 2-ethylhexanoate, and 1 g of gallic acid, and the contents were reacted at 230° C. for 8 hours, and thereafter reacted at 8.3 kPa for one hour. The temperature was lowered to 170° C., and raw material monomers for a styrenic resin, a dually reactive monomer, and dibutyl peroxide were added dropwise thereto from a dropping funnel over one hour. The addition polymerization reaction was matured for one hour while keeping the temperature at 170° C., the temperature was then raised to 210° C., and the raw material monomers for a styrenic resin were removed at 8.3 kPa for one hour, and a polyester site was reacted with the dually reactive monomer. Further, trimellitic anhydride, fumaric acid, and 5 g of tertiary butyl catechol were added thereto at 210° C., and the components were reacted until a desired softening point was reached, to provide an amorphous hybrid resin. The physical properties of the resulting resin are shown in Table 3.

TABLE 3

[Amorphous Polyester or Amorphous Composite Resin]

| | Resin A | Resin B | Resin C |
|---|---|---|---|
| Raw Material Monomers for Polyester | | | |
| BPA-PO[1] | 2,206 g (35) | 3,052 g (50) | 3,920 g (70) |
| BPA-EO[2] | 3,804 g (65) | 2,834 g (50) | 1,560 g (30) |
| Terephthalic Acid | 2,989 g (92) | 1,997 g (69) | 797 g (30) |
| Dodecenylsuccinic Anhydride | — | 280 g (6) | 742 g (40) |
| Trimellitic Anhydride | — | 837 g (25) | 768 g (25) |
| Dually Reactive Monomer | | | |
| Acrylic Acid | — | — | 81 g (6) |
| Raw Material Monomers for Styrenic Resin | | | |
| Styrene | — | — | 1,446 g (84) |
| 2-Ethylhexyl Acrylate | — | — | 276 g (16) |
| Dibutyl Peroxide | — | — | 103 g (6) |
| Physical Properties of Resin | | | |
| Softening Point (° C.) | 110.3 | 121.2 | 135.2 |
| Highest Temperature of Endothermic Peak (° C.) | 75 | 65 | 64 |
| Crystallinity Index | 1.5 | 1.9 | 2.1 |
| Glass Transition Temperature (° C.) | 68.1 | 64.4 | 60.5 |
| Acid Value (mgKOH/g) | 4.7 | 18.4 | 20.5 |
| SP Value | 11.2 | 11.2 | 10.4 |

Note)
Numerical values inside parenthesis express a molar ratio when a total amount of the alcohol component is 100 mol.
[1] Polyoxypropylene(2.2)-2,2-bis(4-hydroxyphenyl)propane
[2] Polyoxyethylene(2.2)-2,2-bis(4-hydroxyphenyl)propane Examples 1 to 17 and 20, and Comparative Examples 1 to 9 and 11

Given amounts of resin binders and a releasing agent "Carnauba Wax C1" (manufactured by S. Kato & CO., melting point: 83° C.) as listed in Table 4 or 5, and 5 parts by mass of a colorant "ECB-301" (manufactured by DAIN-ICHISEIKA COLOR & CHEMICALS MFG. CO., LTD., Phthalocyanine Blue (P.B. 15:3)), and 0.5 parts by mass of a charge control agent "BONTRON E-304" (manufactured by Orient Chemical Industries Co., Ltd.) were mixed with a Henschel mixer, and the mixture was melt-kneaded under the conditions given below.

The raw material mixture obtained was fed with a table feeder to a continuous open-roller type kneader "Kneadex" (manufactured by MITSUI MINING COMPANY, LIMITED), and kneaded, to provide a kneaded product. The continuous open-roller type kneader used in this time had an outer diameter of roller of 0.14 m and an effective length of roller of 0.8 m, and the operating conditions were a rotational speed of a high-rotation roller (front roller) of 75 r/min (33 m/min), a rotational speed of a low-rotation roller (back roller) of 50 r/min (22 m/min), and a gap between the rollers of 0.1 mm. The temperatures of the heating medium and the cooling medium inside the rollers were as follows. The high-rotation roller had a temperature at the raw material supplying side of 150° C., and a temperature at the kneaded product-discharging side of 100° C., and the low-rotation roller had a temperature at the raw material supplying side of 75° C., and a temperature at the kneaded product-discharging side of 30° C. In addition, the feeding rate of the raw material mixture was 10 kg/h, and the average residence time was about 5 minutes.

The kneaded product obtained was cooled, and then roughly pulverized with a pulverizer "Rotoplex" (manufactured by TOA KIKAI SEISAKUSHO), and a sieve having an opening of 2 mm was used, to provide a roughly pulverized product having a particle size of 2 mm or less. The roughly pulverized product was subjected to fine pulverization and upper limit classification (exclusion of coarse powder) with an opposed jet mill "400AFG" (manufactured by HOSOKAWA ALPINE AG). Further, the pulverized product was subjected to lower limit classification (exclusion of fine powder) with a classifier "TTSP" (manufactured by HOSOKAWA ALPINE AG), to provide toner particles having a volume-median particle size of 5.5 μm.

One hundred parts by mass of the toner particles obtained were mixed with 1.0 part by mass of a hydrophobic silica "R972" (manufactured by Nippon Aerosil Co., Ltd., hydrophobic treatment agent: DMDS, average particle size: 16 inn) and 1.0 part by mass of a hydrophobic silica "RY-50" (manufactured by Nippon Aerosil Co., Ltd., hydrophobic treatment agent: silicone oil, average particle size: 40 nm) as external additives with a Henschel mixer (manufactured by MITSUI MINING COMPANY, LIMITED) at 3,000 r/min (peripheral speed: 32 m/sec) for 3 minutes, to provide each of the toners.

Example 18

Given amounts of resin binders as listed in Table 4, 5 parts by mass of a colorant "ECB-301" (manufactured by DAINICHISEIKA COLOR & CHEMICALS MFG. CO., LTD., Phthalocyanine Blue (P.B. 15:3)), 3 parts by mass of a releasing agent "WEP-8" (manufactured by NOF Corporation, synthetic ester wax (ester of pentaerythritol and fatty acid), melting point: 79° C.), and 0.5 parts by mass of a charge control agent "BONTRON E-304" (manufactured by Orient Chemical Industries Co., Ltd.) were mixed with a Henschel mixer, and thereafter the mixture was melt-kneaded under the same conditions as in Example 1.

The kneaded product obtained was cooled, and then roughly pulverized with a pulverizer "Rotoplex" (manufactured by TOA KIKAI SEISAKUSHO), and a sieve having an opening of 2 mm was used, to provide a roughly pulverized product having a particle size of 2 mm or less. The roughly pulverized product was subjected to fine pulverization and upper limit classification (exclusion of coarse powder) with an opposed jet mill "400AFG" (manufactured by HOSOKAWA ALPINE AG). Further, the pulverized product was subjected to lower limit classification (exclusion of fine powder) with a classifier "TTSP" (manufactured by HOSOKAWA ALPINE AG), to provide toner particles having a volume-median particle size of 5.5 μm.

One hundred parts by mass of the toner particles obtained were mixed with 1.0 part by mass of a hydrophobic silica "R972" (manufactured by Nippon Aerosil Co., Ltd., hydrophobic treatment agent: DMDS, average particle size: 16 nm) and 1.0 part by mass of a hydrophobic silica "RY-50" (manufactured by Nippon Aerosil Co., Ltd., hydrophobic treatment agent: silicone oil, average particle size: 40 nm) as external additives with a Henschel mixer (manufactured by MITSUI MINING COMPANY, LIMITED) at 3,000 r/min (peripheral speed: 32 m/sec) for 3 minutes, to provide a toner.

Example 19

Given amounts of resin binders as listed in Table 4, 5 parts by mass of a colorant "ECB-301" (manufactured by DAINICHISEIKA COLOR & CHEMICALS MFG. CO., LTD., Phthalocyanine Blue (P.B. 15:3)), 3 parts by mass of a releasing agent "Carnauba Wax C1" (manufactured by S. Kato & CO., melting point: 83° C.), 3 parts by mass of a releasing agent "HNP-9" (manufactured by NIPPON SEIRO CO., LTD., paraffin wax, melting point: 75° C.), and 0.5 parts by mass of a charge control agent "BONTRON E-304" (manufactured by Orient Chemical Industries Co., Ltd.) were mixed with a Henschel mixer, and thereafter the mixture was melt-kneaded under the same conditions as in Example 1.

The kneaded product obtained was cooled, and then roughly pulverized with a pulverizer "Rotoplex" (manufactured by TOA KIKAI SEISAKUSHO), and a sieve having an opening of 2 mm was used, to provide a roughly pulverized product having a particle size of 2 mm or less. The roughly pulverized product was subjected to fine pulverization and upper limit classification (exclusion of coarse powder) with an opposed jet mill "400AFG" (manufactured by HOSOKAWA ALPINE AG). Further, the pulverized product was subjected to lower limit classification (exclusion of fine powder) with a classifier "TTSP" (manufactured by HOSOKAWA ALPINE AG), to provide toner particles having a volume-median particle size of 5.5 μm.

One hundred parts by mass of the toner particles obtained were mixed with 1.0 part by mass of a hydrophobic silica "R972" (manufactured by Nippon Aerosil Co., Ltd., hydrophobic treatment agent: DMDS, average particle size: 16 nm) and 1.0 part by mass of a hydrophobic silica "RY-50" (manufactured by Nippon Aerosil Co., Ltd., hydrophobic treatment agent: silicone oil, average particle size: 40 nm) as external additives with a Henschel mixer (manufactured by MITSUI MINING COMPANY, LIMITED) at 3,000 r/min (peripheral speed: 32 m/sec) for 3 minutes, to provide a toner.

Example 21

Given amounts of resin binders as listed in Table 4, 5 parts by mass of a colorant "ECB-301" (manufactured by DAINICHISEIKA COLOR & CHEMICALS MFG. CO., LTD., Phthalocyanine Blue (P.B. 15:3)), 3 parts by mass of a releasing agent "SS-1" (manufactured by Boso oil and fat Co., Ltd., rice wax, melting point: 79° C.), and 0.5 parts by mass of a charge control agent "BONTRON E-304" (manufactured by Orient Chemical Industries Co., Ltd.) were mixed with a Henschel mixer, and thereafter the mixture was melt-kneaded under the same conditions as in Example 1.

The kneaded product obtained was cooled, and then roughly pulverized with a pulverizer "Rotoplex" (manufactured by TOA KIKAI SEISAKUSHO), and a sieve having an opening of 2 mm was used, to provide a roughly pulverized product having a particle size of 2 mm or less. The roughly pulverized product was subjected to fine pulverization and upper limit classification (exclusion of coarse powder) with an opposed jet mill "400AFG" (manufactured by HOSOKAWA ALPINE AG). Further, the pulverized product was subjected to lower limit classification (exclusion of fine powder) with a classifier "TTSP" (manufactured by HOSOKAWA ALPINE AG), to provide toner particles having a volume-median particle size of 5.5 μm.

One hundred parts by mass of the toner particles obtained were mixed with 1.0 part by mass of a hydrophobic silica "R972" (manufactured by Nippon Aerosil Co., Ltd., hydrophobic treatment agent: DMDS, average particle size: 16 nm) and 1.0 part by mass of a hydrophobic silica "RY-50" (manufactured by Nippon Aerosil Co., Ltd., hydrophobic treatment agent: silicone oil, average particle size: 40 nm) as external additives with a Henschel mixer (manufactured by MITSUI MINING COMPANY, LIMITED) at 3,000 r/min (peripheral speed: 32 m/sec) for 3 minutes, to provide a toner.

Comparative Example 10

Given amounts of resin binders as listed in Table 5, 5 parts by mass of a colorant "ECB-301" (manufactured by DAINICHISEIKA COLOR & CHEMICALS MFG. CO., LTD., Phthalocyanine Blue (P.B. 15:3)), 3 parts by mass of a releasing agent "HNP-9" (manufactured by NIPPON SEIRO CO., LTD., paraffin wax, melting point: 75° C.), and 0.5 parts by mass of a charge control agent "BONTRON E-304" (manufactured by Orient Chemical Industries Co., Ltd.) were mixed with a Henschel mixer, and thereafter the mixture was melt-kneaded under the same conditions as in Example 1.

The kneaded product obtained was cooled, and then roughly pulverized with a pulverizer "Rotoplex" (manufactured by TOA KIKAI SEISAKUSHO), and a sieve having an opening of 2 mm was used, to provide a roughly pulverized product having a particle size of 2 mm or less. The roughly pulverized product was subjected to fine pulverization and upper limit classification (exclusion of coarse powder) with an opposed jet mill "400AFG" (manufactured by HOSOKAWA ALPINE AG). Further, the pulverized product was subjected to lower limit classification (exclusion of fine powder) with a classifier "TTSP" (manufactured by HOSOKAWA ALPINE AG), to provide toner particles having a volume-median particle size of 5.5 μm.

One hundred parts by mass of the toner particles obtained were mixed with 1.0 part by mass of a hydrophobic silica "R972" (manufactured by Nippon Aerosil Co., Ltd., hydrophobic treatment agent: DMDS, average particle size: 16 nm) and 1.0 part by mass of a hydrophobic silica "RY-50" (manufactured by Nippon Aerosil Co., Ltd., hydrophobic treatment agent: silicone oil, average particle size: 40 nm) as external additives with a Henschel mixer (manufactured by MITSUI MINING COMPANY, LIMITED) at 3,000 r/min (peripheral speed: 32 m/sec) for 3 minutes, to provide a toner.

Test Example 1 [Low-Temperature Fusing Ability]

Each of the toners was loaded to a nonmagnetic monocomponent developer device "OKI MICROLINE 5400" (manufactured by Oki Data Corporation). With adjusting an amount of toner adhesion to 0.45±0.03 mg/cm$^2$, a solid image of a size of 4.1 cm×13.0 cm was printed out on "J sheet" (manufactured by Fuji Xerox Office Supplies). The solid image was taken out before passing through a fusing device, to provide an unfused image. The unfused image obtained was fused with an external fusing device which was a modified fusing device of "Microline 3010" (manufactured by Oki Data Corporation) at a fusing rate of 240 mm/sec while setting a fusing roller temperature at 100° C. Thereafter, the same procedures were carried out with setting a fusing roller temperature at 105° C. The unfused images were subjected to a fusing treatment at each of temperatures while raising the fusing roller temperatures to 200° C. in an increment of 5° C., to provide fused images. A mending tape (manufactured by Sumitomo 3M Limited) was adhered to images fused at each of the temperatures, and thereafter a 500 g cylindrical weight was placed thereon, so that the tape was sufficiently adhered to the fused images. Thereafter, the mending tape was carefully and slowly removed from the fused images, and the optical reflective densities of the images after the tape removal were measured with a reflective densitometer "RD-915" (manufactured by Macbeth Process Measurements Co.). The images before tape adhesion were also previously measured for their optical reflective densities, and a temperature of the fusing roller at which a ratio [reflective density after tape removal/reflective density before tape adhesion]×100) initially exceeds 90% is defined as a lowest fusing temperature, which was used as an index for low-temperature fusing ability. The results are shown in Table 4 or 5. The lower the lowest fusing temperature, the more excellent the low-temperature fusing ability, and the lowest fusing temperature is preferably 165° C. or lower, more preferably 160° C. or lower, and even more preferably 158° C. or lower.

Test Example 2 [Heat-Resistant Storage Property]

A 20 mL polypropylene container was charged with 4 g of a toner, and the container was placed in a thermohygrostat at a temperature of 50° C. and a relative humidity of 80%, and allowed to stand for 48 hours in a state that a lid of the container was open. The degrees of aggregation before and after being allowed to stand were measured, and the storage property was evaluated by a difference in degrees of aggregation of both before and after being allowed to stand. The results are shown in Table 4 or 5. The smaller the value of a difference, the more excellent the heat-resistant storage property, and the value is preferably 3.0 or less, more preferably 2.0 or less, and even more preferably 1.5 or less.

The degree of aggregation is measured with a powder tester (manufactured by Hosokawa Micron Corporation). Sieves having opening of 150 μm, 75 μm, and 45 μm are stacked on top of each other, 4 g of a toner is placed on the uppermost sieve, and the sieves are vibrated at an oscillation width of 1 mm for 10 seconds. After the vibration, an amount of the toner remaining on the sieve is measured, and the degree of aggregation is calculated using the following sets of formulas:

Degree of Aggregation=$a+b+c$, wherein $$a = \frac{\text{Mass of Toner Remaining on Top Sieve (g)}}{\text{Amount of Sample (g)}} \times 100$$

$$b = \frac{\text{Mass of Toner Remaining on Middle Sieve (g)}}{\text{Amount of Sample (g)}} \times 100 \times \frac{3}{5}$$

$$c = \frac{\text{Mass of Toner Remaining on Bottom Sieve (g)}}{\text{Amount of Sample (g)}} \times 100 \times \frac{1}{5}$$

Test Example 3 [Durability]

A toner was loaded to a nonmagnetic monocomponent developer device "OKI MICROLINE 9300PS" (manufactured by OKI DATA CORPORATION), and an image with a print coverage of 5% was printed under environment conditions of a temperature of 30° C. and a relative humidity of 90% for 20 sheets, and thereafter an optical reflective density was measured with a reflective densitometer "RD-915" (manufactured by Macbeth Process Measurements Co.). Further, printing was carried out for 1,000 sheets, and thereafter an optical reflective density was again measured with a reflective densitometer "RD-915" (manufactured by Macbeth Process Measurements Co.). A difference of both the optical densities was calculated, and durability was evaluated. The results are shown in Table 4 or 5. The smaller the value of a difference, the more excellent the durability, and the value is preferably 0.30 or less, more preferably 0.20 or less, and even more preferably 0.10 or less. In the table, "<0.10" shows that the value of a difference is 0.10 or less, and ">0.50" shows that a difference is 0.5 or more.

From the comparisons between Examples 1 to 3 and Comparative Example 1, the comparisons between Examples 5 to 7 and Comparative Example 4, and the comparisons between Examples 10 to 11 and Comparative Example 5, it can be seen that as the amount of the ester wax

TABLE 4

| | Resin Binder (Total of 100 Parts by Mass) | | | | | | | | | Evaluation of Toner | | |
|---|---|---|---|---|---|---|---|---|---|---|---|---|
| | Amorphous Resin [A] | | Crystalline Resin [C] | | | A/C | Releasing Agent | | C/Ester Wax | Low-Temp. Fusing | Heat-Resistant | |
| | Resin A (Parts by Mass) | Resin B (Parts by Mass) | Kinds | Parts by Mass | P/S | (Mass Ratio) | Kinds | Parts by Mass | (Mass Ratio) | Ability (° C.) | Storage Property | Durability |
| Ex. 1 | 60 | 30 | Resin a | 10 | 90/10 | 90/10 | Carnauba Wax | 3 | 3.3 | 155 | 1.3 | <0.10 |
| Ex. 2 | 60 | 30 | Resin a | 10 | 90/10 | 90/10 | Carnauba Wax | 5 | 2.0 | 155 | 1.7 | <0.10 |
| Ex. 3 | 60 | 30 | Resin a | 10 | 90/10 | 90/10 | Carnauba Wax | 7 | 1.4 | 150 | 2.0 | <0.10 |
| Ex. 4 | 65 | 30 | Resin a | 5 | 90/10 | 95/5 | Carnauba Wax | 0.6 | 8.3 | 165 | 1.0 | 0.15 |
| Ex. 5 | 65 | 30 | Resin a | 5 | 90/10 | 95/5 | Carnauba Wax | 3 | 1.7 | 165 | 1.1 | <0.10 |
| Ex. 6 | 65 | 30 | Resin a | 5 | 90/10 | 95/5 | Carnauba Wax | 7 | 0.7 | 160 | 1.6 | <0.10 |
| Ex. 7 | 65 | 30 | Resin a | 5 | 90/10 | 95/5 | Carnauba Wax | 10 | 0.5 | 155 | 2.1 | 0.13 |
| Ex. 8 | 50 | 30 | Resin a | 20 | 90/10 | 80/20 | Carnauba Wax | 3 | 6.7 | 150 | 1.7 | 0.12 |
| Ex. 9 | 40 | 30 | Resin a | 30 | 90/10 | 70/30 | Carnauba Wax | 5 | 6.0 | 145 | 2.0 | 0.16 |
| Ex. 10 | 30 | 30 | Resin a | 40 | 90/10 | 60/40 | Carnauba Wax | 4.5 | 8.9 | 140 | 2.4 | 0.29 |
| Ex. 11 | 30 | 30 | Resin a | 40 | 90/10 | 60/40 | Carnauba Wax | 10 | 4.0 | 135 | 2.7 | 0.25 |
| Ex. 12 | 60 | 30 | Resin b | 10 | 80/20 | 90/10 | Carnauba Wax | 3 | 3.3 | 155 | 1.4 | <0.10 |
| Ex. 13 | 60 | 30 | Resin c | 10 | 70/30 | 90/10 | Carnauba Wax | 3 | 3.3 | 155 | 1.8 | 0.11 |
| Ex. 14 | 60 | 30 | Resin d | 10 | 60/40 | 90/10 | Carnauba Wax | 3 | 3.3 | 150 | 2.7 | 0.15 |
| Ex. 15 | 60 | 30 | Resin e | 10 | 80/20 | 90/10 | Carnauba Wax | 3 | 3.3 | 155 | 1.2 | 0.10 |
| Ex. 16 | 60 | 30 | Resin f | 10 | 80/20 | 90/10 | Carnauba Wax | 3 | 3.3 | 155 | 2.4 | 0.15 |
| Ex. 17 | 60 | 30 | Resin g | 10 | 80/20 | 90/10 | Carnauba Wax | 3 | 3.3 | 155 | 2.2 | 0.18 |
| Ex. 18 | 60 | 30 | Resin a | 10 | 90/10 | 90/10 | Synthetic Ester Wax | 3 | 3.3 | 155 | 1.4 | <0.10 |
| Ex. 19 | 60 | 30 | Resin a | 10 | 90/10 | 90/10 | Carnauba Wax Paraffin Wax | 3 3 | 3.3 | 150 | 1.5 | <0.10 |
| Ex. 20 | 90 | — | Resin a | 10 | 90/10 | 90/10 | Carnauba Wax | 3 | 3.3 | 150 | 1.2 | 0.11 |
| Ex. 21 | 60 | 30 | Resin a | 10 | 90/10 | 90/10 | Rice Wax | 3 | 3.3 | 155 | 1.7 | <0.10 |

TABLE 5

| | Resin Binder (Total of 100 Parts by Mass) | | | | | | | | | Evaluation of Toner | | |
|---|---|---|---|---|---|---|---|---|---|---|---|---|
| | Amorphous Resin [A] | | Crystalline Resin [C] | | | A/C | Releasing Agent | | C/Ester Wax | Low-Temp. Fusing | Heat-Resistant | |
| | Resin A (Parts by Mass) | Resin B (Parts by Mass) | Kinds | Parts by Mass | P/S | (Mass Ratio) | Kinds | Parts by Mass | (Mass Ratio) | Ability (° C.) | Storage Property | Durability |
| Comp. Ex. 1 | 60 | 30 | Resin a | 10 | 90/10 | 90/10 | Carnauba Wax | 1 | 10.0 | 160 | 1.2 | 0.36 |
| Comp. Ex. 2 | 67 | 30 | Resin a | 3 | 90/10 | 97/3 | Carnauba Wax | 3 | 1.0 | 170 | 1.0 | <0.10 |
| Comp. Ex. 3 | 67 | 30 | Resin a | 3 | 90/10 | 97/3 | Carnauba Wax | 7 | 0.4 | 165 | 3.2 | <0.10 |
| Comp. Ex. 4 | 65 | 30 | Resin a | 5 | 90/10 | 95/5 | Carnauba Wax | 12 | 0.4 | 155 | 3.3 | 0.16 |
| Comp. Ex. 5 | 30 | 30 | Resin a | 40 | 90/10 | 60/40 | Carnauba Wax | 3 | 13.3 | 140 | 2.4 | 0.40 |
| Comp. Ex. 6 | 25 | 30 | Resin a | 45 | 90/10 | 55/45 | Carnauba Wax | 7 | 6.4 | 135 | 3.0 | 0.29 |
| Comp. Ex. 7 | 60 | 30 | Resin h | 10 | 80/20 | 90/10 | Carnauba Wax | 3 | 3.3 | 155 | 3.2 | 0.23 |
| Comp. Ex. 8 | 60 | 30 | Resin i | 10 | 100/0 | 90/10 | Carnauba Wax | 3 | 3.3 | 155 | 1.1 | >0.50 |
| Comp. Ex. 9 | 70 | 30 | — | — | — | — | Carnauba Wax | 3 | — | 175 | 0.8 | <0.10 |
| Comp. Ex. 10 | 60 | 30 | Resin a | 10 | 90/10 | 90/10 | Paraffin Wax | 3 | — | 160 | 1.2 | >0.50 |
| Comp. Ex. 11 | Resin C = 90 | 30 | Resin a | 10 | 90/10 | 90/10 | Carnauba Wax | 3 | 3.3 | 155 | 3.1 | 0.21 | increases, the C/W mass ratio is lowered, and that the toner of Example 1 in which a C/W ratio is 3.3 is more excellent in the balance between low-temperature fusing ability, storage property, and durability.

In the comparisons between Examples 1, 5, and 8 and Comparative Example 2, it can be seen that the toner of Example 1 in which a mass ratio of the amorphous polyester resin/the crystalline composite resin is 90/10 is more excellent in the balance between low-temperature fusing ability, storage property, and durability.

In the comparisons between Examples 1, and 12 to 14 and Comparative Example 8, it can be seen that the toner of Example 1 in which a mass ratio of the polycondensation resin component/the styrenic resin component in the crystalline composite resin is 90/10 is more excellent in the balance between low-temperature fusing ability, storage property, and durability.

In the comparisons between Examples 12, 15, and 16, it can be seen that the toner of Example 12 in which the alcohol component for the polycondensation resin moiety for the crystalline composite resin is 1,10-decanediol is more excellent in the balance between low-temperature fusing ability, storage property, and durability.

In the comparisons between Examples 12 and 17, it can be seen that the carboxylic acid component for the polycondensation resin moiety for the crystalline composite resin is more excellent in sebacic acid having 10 carbon atoms, from the viewpoint of low-temperature fusing ability, storage property, and durability.

Since Comparative Examples 1 and 5 have smaller amounts of the ester wax based on the crystalline composite resin, it is considered that dispersibility is lowered, so that storage property and durability are lowered.

Since Comparative Examples 2 and 3 have smaller amounts of the crystalline composite resin, low-temperature fusing ability is not fully exhibited.

Since Comparative Example 4 has a larger amount of an ester wax, storage property and durability are lowered.

Since Comparative Example 6 has an exceedingly large amount of a crystalline composite resin, storage property and durability are lowered.

Since in Comparative Example 7 a mid-chain aliphatic diol is used as an alcohol component for the polycondensation resin component for the crystalline composite resin and an aromatic dicarboxylic acid compound as a carboxylic acid component, its compatibility with an amorphous polyester is high, so that storage property and durability are lowered.

Since in Comparative Example 8 a crystalline resin is a crystalline polyester not having a styrenic resin component, durability is lowered which is considered to be due to the lowering in dispersibility of the wax.

Since Comparative Example 9 does not use a crystalline resin, low-temperature fusing ability is lowered.

Since Comparative Example 10 uses a paraffin wax as a releasing agent, storage property and durability are lowered, which is considered to be due to the lowering of dispersibility of the crystalline resin.

Since in Comparative Example 11 the amorphous resin is a hybrid resin including a styrenic resin component and a polycondensation resin component, it is considered that its compatibility with a crystalline composite resin is high, so that storage property and durability are lowered.

The toner for electrophotography of the present invention is suitably used in development of latent images or the like which is formed in electrostatic development method, electrostatic recording method, electrostatic printing method or the like.

The invention claimed is:

1. A toner for electrophotography comprising
   a resin binder comprising a crystalline composite resin C and an amorphous polyester A and
   an ester wax,
   wherein the crystalline composite resin C is a resin comprising a polycondensation resin component and a styrenic resin component, wherein the polycondensation resin component is obtained by polycondensing an alcohol component comprising an aliphatic diol having 9 or more carbon atoms and 14 or less carbon atoms, and a carboxylic acid component comprising an aliphatic dicarboxylic acid compound having 9 or more carbon atoms and 14 or less carbon atoms,
   wherein a mass ratio of the amorphous polyester A to the crystalline composite resin C (amorphous polyester A/crystalline composite resin C) is 60/40 or more and 95/5 or less, and
   wherein a mass ratio of the crystalline composite resin C to the ester wax (crystalline composite resin C/ester wax) is 0.5 or more and 9 or less.

2. The toner for electrophotography according to claim 1, wherein a mass ratio of the polycondensation resin component to the styrenic resin component in the crystalline composite resin C (polycondensation resin component/styrenic resin component) is 55/45 or more and 95/5 or less.

3. The toner for electrophotography according to claim 1, wherein the crystalline composite resin C is a resin obtained by polymerizing
   (i) raw material monomers for the polycondensation resin component comprising an alcohol component comprising an aliphatic diol having 9 or more carbon atoms and 14 or less carbon atoms, and a carboxylic acid component comprising an aliphatic dicarboxylic acid compound having 9 or more carbon atoms and 14 or less carbon atoms;
   (ii) raw material monomers for the styrenic resin component; and
   (iii) a dually reactive monomer capable of reacting with the raw material monomers for the polycondensation resin component and the raw material monomers for the styrenic resin component.

4. The toner for electrophotography according to claim 3, wherein the amount of the dually reactive monomer used is 1 mol or more and 30 mol or less, based on 100 mol of a total of the alcohol component for the polycondensation resin component.

5. The toner for electrophotography according to claim 1, wherein the melting point of the ester wax is 60° C. or higher and 100° C. or lower.

6. The toner for electrophotography according to claim 1, wherein the ester wax is at least one member selected from the group consisting of carnauba wax, montan wax, rice wax, esters obtained from a reaction between an aliphatic mono-alcohol having 14 or more carbon atoms and 24 or less carbon atoms and a fatty acid having 14 or more carbon atoms and 24 or less carbon atoms, and esters obtained from a reaction between pentaerythritol and a fatty acid having 14 or more carbon atoms and 24 or less carbon atoms.

7. The toner for electrophotography according to claim 1, wherein the content of the ester wax is 0.6 parts by mass or more and 10 parts by mass or less, based on 100 parts by mass of a total of the crystalline composite resin C and the amorphous polyester A.

8. The toner for electrophotography according to claim 1, wherein the content of the ester wax is 0.6 parts by mass or more and 10 parts by mass or less, based on 100 parts by mass of the resin binder.

9. The toner for electrophotography according to claim 1, wherein the amorphous polyester A is obtained by polycondensing an alcohol component comprising a dihydric or higher polyhydric alcohol and a carboxylic acid component comprising a dicarboxylic or higher polycarboxylic acid compound.

10. The toner for electrophotography according to claim 9, wherein the alcohol component for the amorphous polyester A comprises an alkylene oxide adduct of bisphenol A represented by the formula (I):

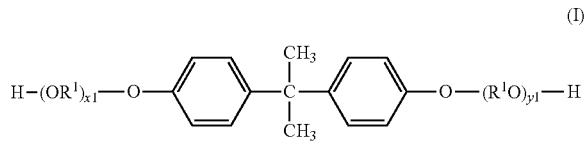
(I)

wherein $R^1O$ and $OR^1$ are an oxyalkylene group, wherein $R^1$ is an ethylene group and/or a propylene group; and each of x1 and y1 is a positive number showing an average number of moles of alkylene oxide added, wherein a value of the sum of x1 and y1 is 1 or more and 16 or less in an amount of 50% by mol or more.

11. The toner for electrophotography according to claim 9, wherein the carboxylic acid component for the amorphous polyester A comprises at least one member selected from the group consisting of terephthalic acid, succinic acid substituted with an alkyl group or alkenyl group having 2 or more carbon atoms and 20 or less carbon atoms, and trimellitic anhydride.

12. The toner for electrophotography according to claim 1, wherein the amorphous polyester A comprises two kinds of amorphous polyesters of which softening points differ by 5° C. or more.

13. The toner for electrophotography according to claim 12, wherein the amorphous polyester AL having a lower softening point is a resin obtained by polycondensing an alcohol component and a carboxylic acid component, wherein the alcohol component comprises an ethylene oxide adduct of bisphenol A represented by the formula (II):

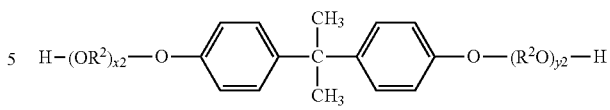
(II)

wherein $R^2O$ and $OR^2$ are an oxyethylene group; and each of x2 and y2 is a positive number showing an average number of moles of ethylene oxide added, wherein a value of the sum of x2 and y2 is 1 or more and 16 or less in an amount of 55% by mol or more and 90% by mol or less.

14. The toner for electrophotography according to claim 1, wherein the aliphatic diol having 9 or more carbon atoms and 14 or less carbon atoms comprises one or two members selected from 1,10-decanediol and 1,12-dodecanediol.

15. The toner for electrophotography according to claim 1, wherein the aliphatic dicarboxylic acid compound having 9 or more carbon atoms and 14 or less carbon atoms comprises sebacic acid.

16. A method for producing the toner of claim 1, the method comprising:
melt-kneading toner components comprising a crystalline composite resin C, an amorphous polyester A, and an ester wax with an open roller-type kneader, thereby obtaining a kneaded product; and
pulverizing the kneaded product.

17. The toner for electrophotography according to claim 1, wherein the content of the crystalline composite resin C is 80% by mass or more of the crystalline resin.

18. The toner for electrophotography according to claim 1, wherein the content of the amorphous resin A is 90% by mass or more of the amorphous resin.

19. The toner for electrophotography according to claim 1, wherein a total content of the crystalline composite resin C and the amorphous resin A is 80% by mass or more of the resin binder.

20. The toner for electrophotography according to claim 1, wherein the content of the ester wax is 20% by mass or more of the releasing agent.

* * * * *